United States Patent [19]
Hirasawa

[11] Patent Number: 5,745,798
[45] Date of Patent: Apr. 28, 1998

[54] ELECTRONIC APPARATUS

[75] Inventor: Masahide Hirasawa, Kanagawa-ken, Japan

[73] Assignee: Canon Kabushiki Kaisha, Tokyo, Japan

[21] Appl. No.: 635,704

[22] Filed: Apr. 22, 1996

[30] Foreign Application Priority Data

Apr. 27, 1995 [JP] Japan ................................ 7-104021
May 31, 1995 [JP] Japan ................................ 7-133737

[51] Int. Cl.[6] .................................................. G03B 17/00
[52] U.S. Cl. ........................ 396/51; 396/373; 396/374
[58] Field of Search ............................ 396/51, 373, 374

[56] References Cited

U.S. PATENT DOCUMENTS 5,138,354  8/1992  Okada et al. ................ 396/51
5,200,774  4/1993  Nakajima ..................... 396/373

*Primary Examiner*—Russell E. Adams
*Attorney, Agent, or Firm*—Robin, Blecker & Daley

[57] ABSTRACT

A video camera has a normal operation control mode in which a normal operation is allowed to be performed and a demonstration mode in which each of a plurality of functions of the video camera is sequentially executed for a predetermined period of time, and is arranged to permit switching between the normal operation control mode and the demonstration mode. When a visual-line detecting circuit, a switch mounted on an eyecup, a sensor composed of a light-emitting element and a light-receiving element, or the like, detects that the operator is viewing an electronic viewfinder during the demonstration mode, the demonstration mode is switched over to the normal operation control mode. The demonstration mode is resumed upon detection of detachment of the eye of the operator from the electronic viewfinder.

23 Claims, 27 Drawing Sheets

FIG.3(a)

MANIPULATION DURING DEMONSTRATION MODE

- START — S121
- EXECUTION OF DEMONSTRATION MODE — S122
- SET MODE SW TO CAL — S123
- EXECUTION OF VISUAL-LINE CALIBRATION — S124
- SET MODE SW TO CAMERA — S125
- EXECUTION OF NORMAL OPERATION — S126
- END — S127

FIG.3(b)

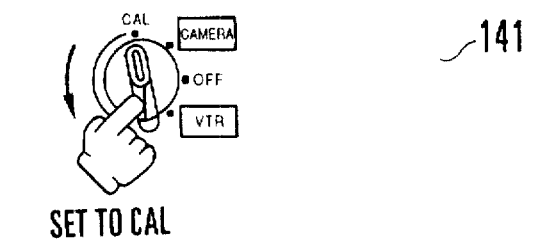

SET TO CAL — 141

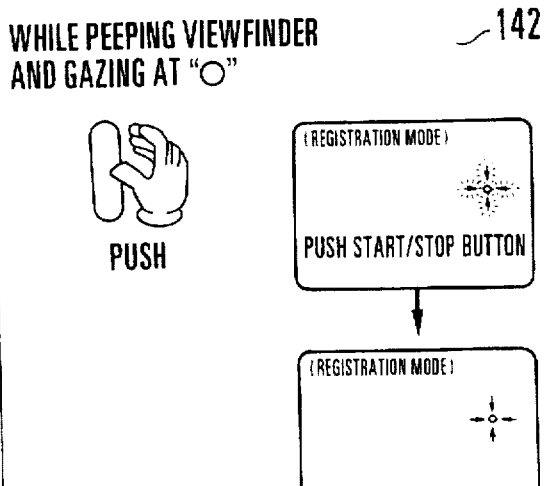

WHILE PEEPING VIEWFINDER AND GAZING AT "○" — 142

PUSH (REGISTRATION MODE) PUSH START/STOP BUTTON (REGISTRATION MODE)

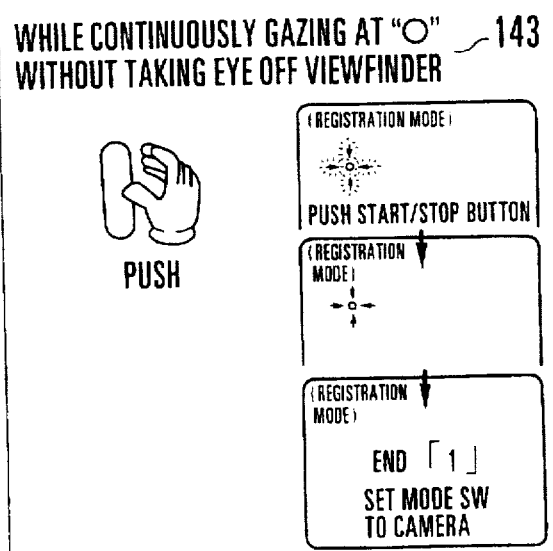

WHILE CONTINUOUSLY GAZING AT "○" WITHOUT TAKING EYE OFF VIEWFINDER — 143

PUSH (REGISTRATION MODE) PUSH START/STOP BUTTON (REGISTRATION MODE)

(REGISTRATION MODE) END 「1」 SET MODE SW TO CAMERA

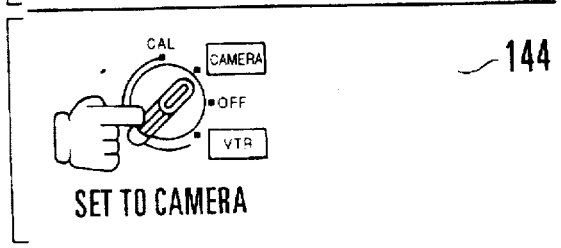

SET TO CAMERA — 144

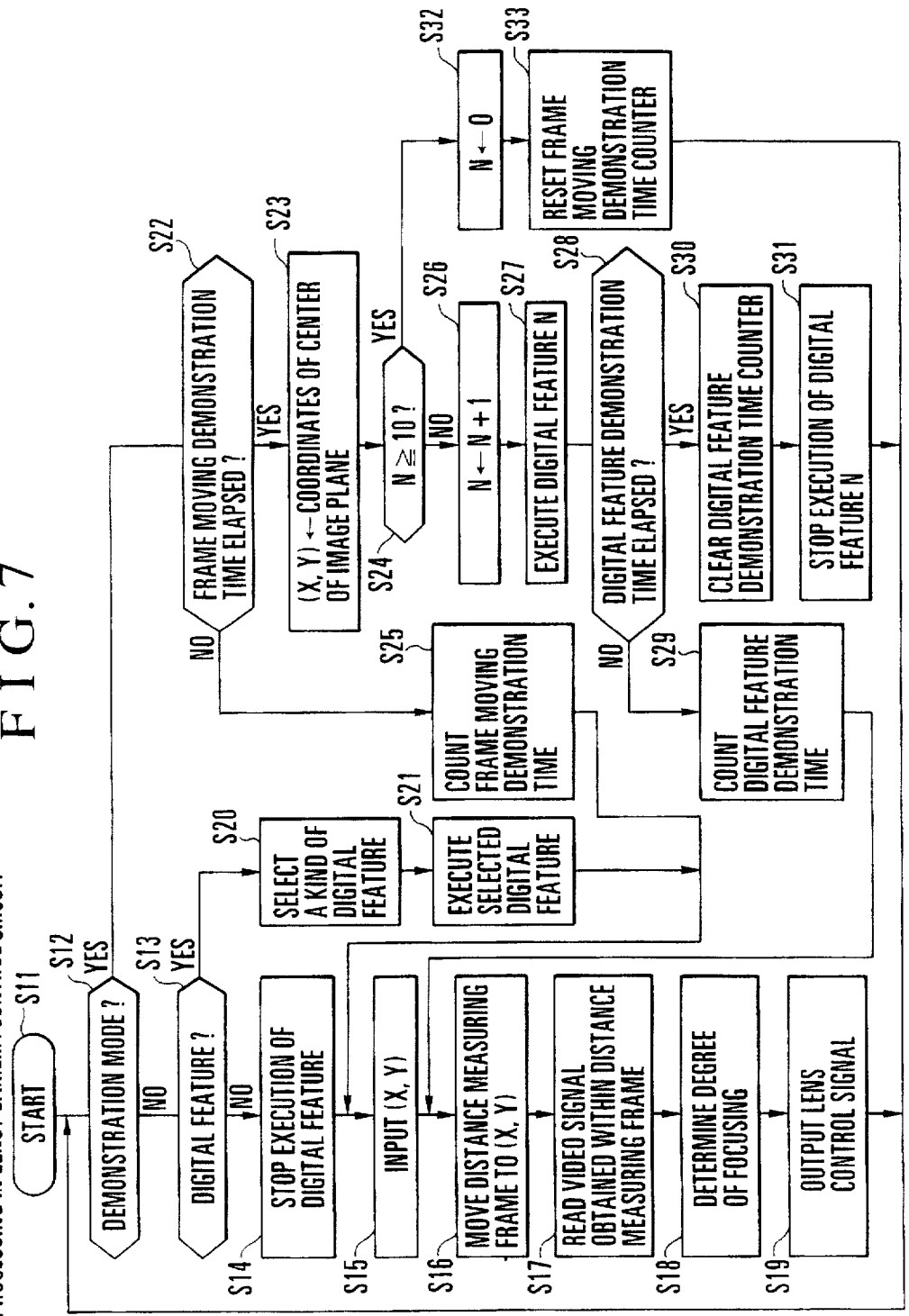

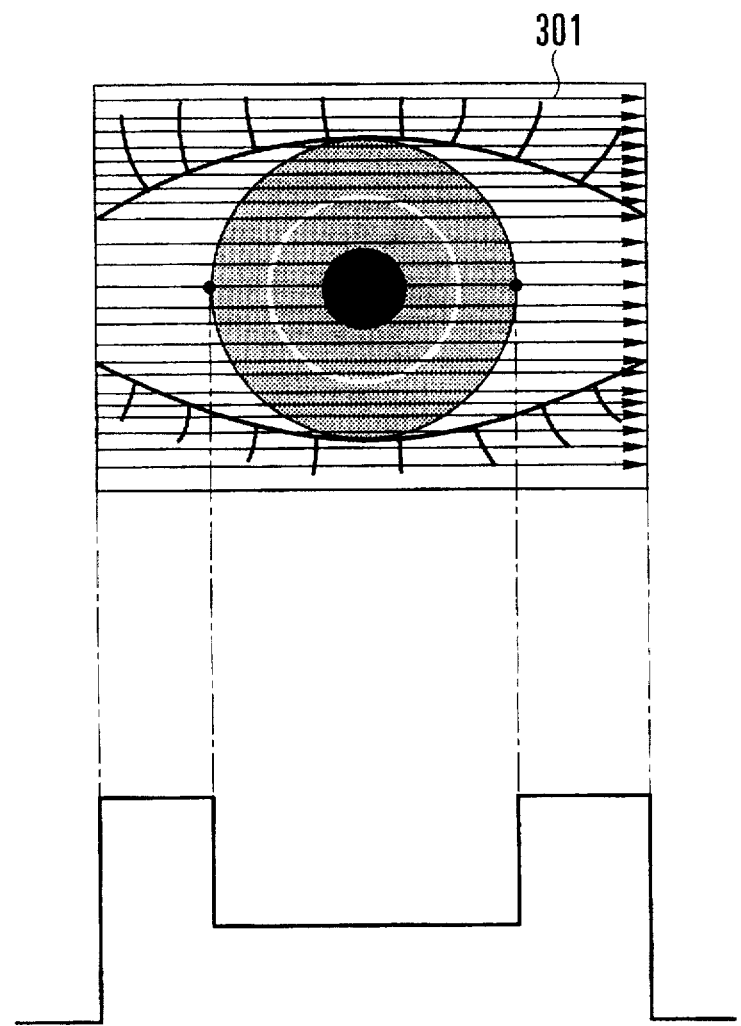
F I G. 9(a)
F I G. 9(b)
F I G. 9(c)
TIME t

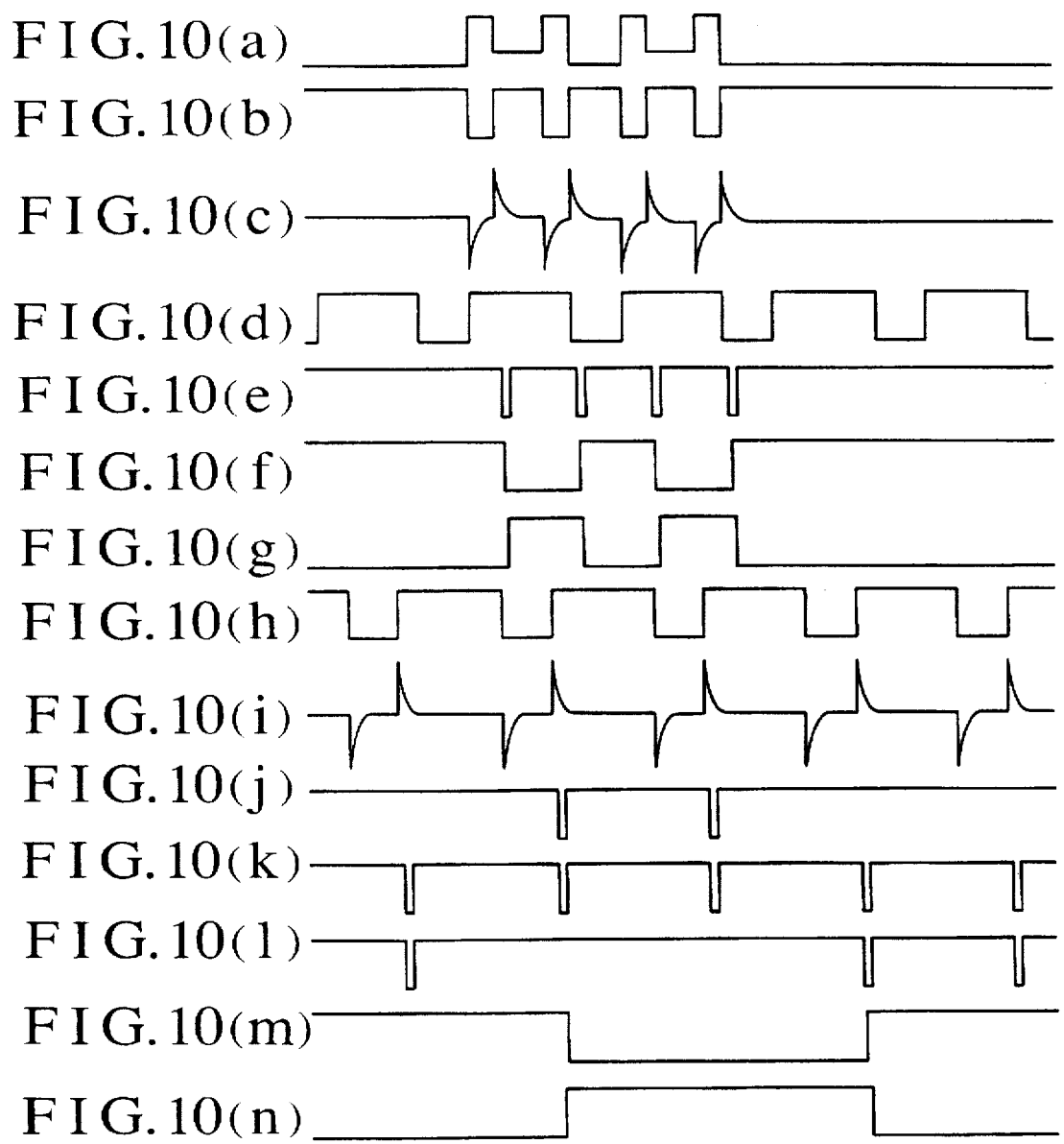

FIG. 13

| DIGITAL FEATURE No. N | KINDS OF DIGITAL FEATURE PROCESSINGS | |
|---|---|---|
| 1 | TELEPHOTO CONVERTER | DIGITAL EFFECT |
| 2 | STROBOSCOPIC ACTION | |
| 3 | FREEZE | |
| 4 | ART | |
| 5 | MOSAIC | |
| 6 | OVERLAP | DIGITAL FADER |
| 7 | SCROLL | |
| 8 | WIPE | |
| 9 | ZOOM WIPE | |
| 10 | FADE | |

FIG. 19
PRINCIPLE OF OPTICAL TYPE CAMERA-SHAKE CORRECTION
(AT THE TIME OF NO CAMERA-SHAKE) — VARIABLE ANGLE PRISM
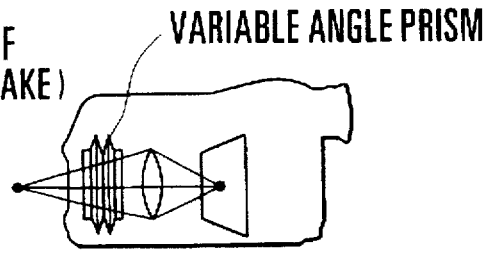
(AT THE TIME OF CAMERA-SHAKE CORRECTION)
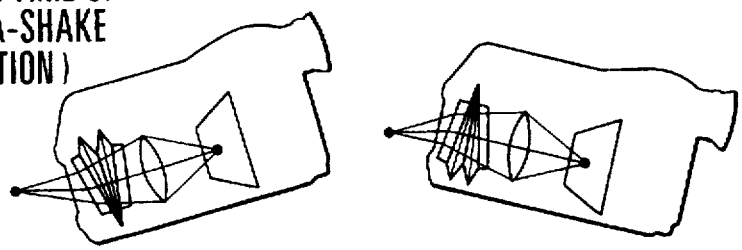
CAMERA-SHAKE IS CORRECTED BY VARYING APEX ANGLE OF VARIABLE ANGLE PRISM INSTANTANEOUSLY ACCORDING TO SHAKE ANGLE DUE TO CAMERA-SHAKE SO AS TO CONTROL ANGLE OF REFRACTION OF LIGHT BEAM F I G. 24
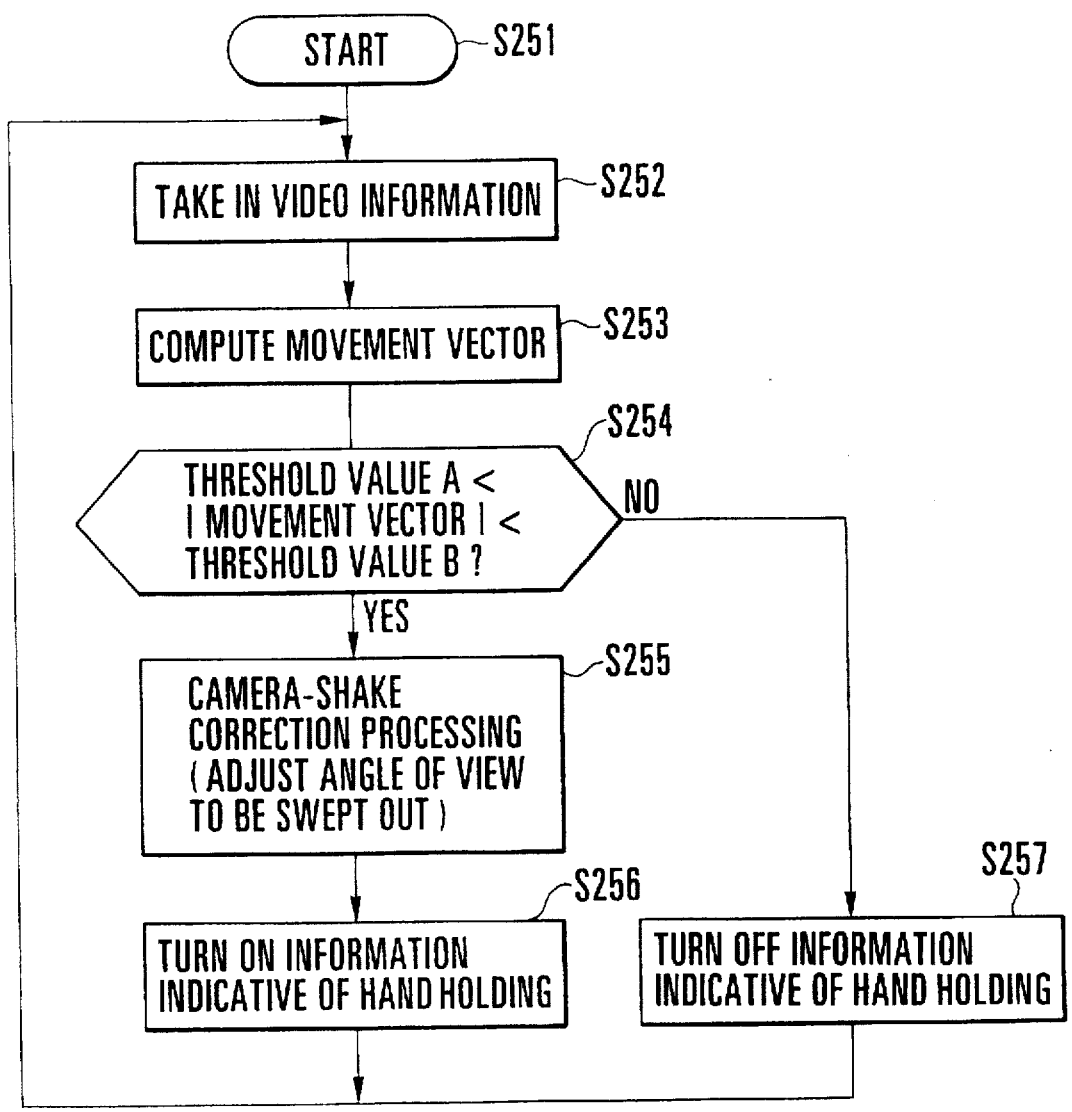

ELECTRONIC APPARATUS

BACKGROUND OF THE INVENTION

1. Field of the Invention

This invention relates to an electronic apparatus arranged to have a plurality of operation modes and to permit confirmation of each of these operation modes with ease and excellent operability.

2. Description of the Related Art

The capacity of one-chip microcomputers and their processing speed are being rapidly increased and a reduction in price of large-capacity memories is being furthered by the recent advancement of the semiconductor technology.

As a result, large-scale integrated circuits have come to be mounted on general consumer appliances. Stores are now selling various products which are compact, low-priced and yet are arranged to have many functions.

Video-tape-recorder-integrated type cameras (hereinafter referred to as VTR-integrated type cameras) are typical examples of such products. In the past, the VTR-integrated type cameras were arranged just to take video images and to record and/or reproduce the images. At present, however, they are often arranged to have a digital feature functions, such as a function by which a part of a video image is electrically enlarged by using a digital memory or the like or a function by which video signals are electrically processed to give special effects. Some of the VTR-integrated type cameras on the market these days arranged to have a visual-line automatic focusing function by which focus is adjusted automatically to an object at which the operator of the VTR-integrated type camera is looking, by detecting the position of an eye of the operator peeping a viewfinder.

Meanwhile, in selling the product (VTR-integrated type camera) having such a multiplicity of functions, it is necessary to let customers at the store know that the product has many functions. It is also necessary to provide means for readily showing what operation is performed in each of the functions and showing which functions are included in the product. Products provided with a "demonstration mode" which is one of such a sales-appealing means have been increasing in number during recent years. In the demonstration mode, a series of functions of the product (VTR-integrated type camera or the like) are performed automatically one after another so as to make effects of each function appeal directly to visual sensation, etc., of the customers.

For example, in the case of a VTR-integrated type camera which is provided with a digital image memory, a number of digital processing actions of photographed video images, as shown in FIG. 13, can be performed. The details of such special processing actions are well known and are, therefore, omitted from description here. These special processing actions are frequently used for attaining special effects and include, for example, a telephoto converter processing by which images are instantly enlarged at a predetermined magnifying rate, a stroboscopic action processing by which recording is intermittently performed, a processing of causing one image to overlap another image and a processing of fading in or out an image. Then, it more easily makes these functions understandable and is more effective to directly show them in the demonstration mode than to show them in letters in a catalog or the like.

FIG. 1 is a flow chart showing by way of example a procedure to be taken in shifting the operation mode of the VTR-integrated type camera to the demonstration mode. At a step S101 of FIG. 1, the flow of operation begins. At a step S102, a power supply is first turned off by operating a power supply switch provided on the product (the VTR-integrated type camera). The demonstration mode is not to be usually used. Therefore, unlike other operation modes, the VTR-integrated type camera is arranged to be not readily operated in the demonstration mode. In this case, at a step S103, both a video-tape fast feeding key (hereinafter referred to as an FF key) and a video-tape rewinding key (hereinafter referred to as a REW key) on the VTR-integrated type camera are simultaneously pushed. At a step S104, while the above-stated two keys are kept pushed simultaneously, the power supply is turned on. With the power supply turned on, the flow comes to a step S105 to have the camera to operate in the demonstration mode. With the demonstration mode executed, the camera comes to operate in operation modes of varied kinds one after another. In terminating the demonstration mode, the flow comes to a step S106 to turn off the power supply by an ending process. Then, in order to execute a normal operation, the power supply is turned on without pushing the above-stated two keys simultaneously at a step S107 shown in FIG. 2. With the power supply turned on in this manner, the VTR-integrated type camera is caused to operate in an ordinary manner.

FIG. 2 is another flow chart showing processes to be carried out by a system control circuit which is arranged to control a system within the VTR-integrated type camera. At a step S107 of FIG. 2, the flow of operation begins. At a step S108, a check is made to find if the power supply is turned on. If so, the flow comes to a step S109 to find if both the FF and REW keys are being pushed simultaneously. If so, the flow comes to a step S110 to bring about the demonstration mode. If the two keys are found not to be simultaneously pushed at the step S109, the flow comes to a step Sill to bring about a normal operation mode. The VTR-integrated type camera is kept in the mode set by the step S110 or by the step Sill until the power supply is turned off in step S112.

In the case of the VTR-integrated type camera of the kind arranged to detect the position of the visual line of the camera operator as mentioned above, the method of control must be adjusted to the individual "habit of eye" of the operator. For this purpose, the operator is required to perform beforehand a calibrating action called "calibration" by which the individual eye habit is registered.

FIGS. 3(a), 3(b) and 3(c) show an operation of shifting from the demonstration mode to a normal operation mode in the product having such a calibration mode. At a step S121 of FIG. 3(a) which is a flow chart, the operation begins. At a step S122, various operations in the demonstration mode are performed. In allowing the customer to operate the product in the normal operation mode while the demonstration mode is still in process, the flow comes to a step S123. At the step S123, a mode switch is turned around into a position "CAL" (a calibrating position) as shown at a part 141 in FIG. 3(b). The operation on this mode switch brings the demonstration mode to an end. The flow of FIG. 3(a) then comes to a step S124. At the step S124, the product then comes into the visual-line calibration mode, i.e., an individual-eye-habit registering mode.

The calibrating action must be performed also in actually using the VTR-integrated type camera. The action therefore belongs to the category of normal operations of the camera. The operation and the state of display made on an electronic viewfinder image plane in the visual-line calibration mode are as shown at parts 142 and 143 in FIG. 3(b). The calibration is performed to correct a deviation of the position of the visual line by looking into the electronic viewfinder and by gazing at an index displayed on the viewfinder image plane. Upon completion of the calibration, the flow of operation comes to a step S125. At the step S125, the position of the mode switch is shifted back to a position "CAMERA" as shown at a part 144 in FIG. 3(b). After that, the camera can be focused on an object at which the operator is looking.

FIG. 3(c) is a flow chart showing processes to be executed within the system control circuit in response to the actions shown in FIGS. 3(a) and 3(b). Referring to FIG. 3(c), at a step S131, the flow of operation begins. At a step S132, a check is made to find if the power supply is turned on. If so, the flow comes to a step S133. At the step S133, a check is made, in the same manner as in the case of FIG. 2, to find if both the FF and REW keys are being simultaneously pushed. If so, the flow comes to a step S134 to obtain the demonstration mode. At steps S135 and 136, checks are made respectively for an operation on the mode switch and for an off-state of the power supply. If the mode switch is found not to be operated and the power supply is found not to be turned off, the demonstration mode is maintained. If the mode switch is found at the step S135 to be operated, the flow of operation shifts to a step S137 which is provided for normal operation modes including the calibration. The VTR-integrated type camera is retained in this state until the power supply is found to be turned off at a step S138. Further, if the FF and REW keys are found at the step S133 not to be simultaneously pushed, the flow of operation shifts directly to the step S137.

However, even in cases where a customer wishes at a store selling the product (VTR-integrated camera) to try to actually operate the product after seeing the demonstration, the mode of the product never shifts to any of ordinary operation modes of the VTR-integrated type camera unless the power supply is first turned off and is again turned on.

Further, once the product is rendered operative, the demonstration mode cannot be resumed unless the operation shown in FIG. 1 is again performed. This is inconvenient for a customer who does not know how to set the product into the demonstration mode. The solution of this problem necessitates attendance of some one at the product to be demonstrated. Hence, the demonstration is troublesome not only to stores but also to customers. It is troublesome also in cases where the operator wishes to confirm the functions of the VTR-integrated type camera or where the operator wishes to show the functions of the camera to other persons.

The troublesomeness of the product further increases in a case where the product is of the kind requiring adjustment of an individual difference (in the eye habit, i.e., a personal error, with respect to the visual line) before use. Then, the advantage of the demonstration mode may be lessened by the increased troublesomeness. Besides, since the demonstration mode must be set all over again once the demonstration mode is cancelled, it is not easy for the store selling the product to carry on the demonstration.

SUMMARY OF THE INVENTION

To solve the above-stated problem of the prior art, it is a first object of this invention to provide an electronic apparatus arranged to automatically detect that the operator of a manufactured unit, i.e., a product, of the electronic apparatus is trying to operate the product while the product is in process of demonstration and to smoothly permit the trial use of the product without any troublesome operation.

It is a second object of this invention to provide an electronic apparatus arranged to automatically detect the end of trial use of the product and to enable a demonstration of the product to be automatically resumed without necessitating any setting operation on the product all over again.

To attain the objects, an electronic apparatus arranged as a preferred embodiment of this invention to permit switching between a first operation control mode and a second operation control mode comprises monitor means for permitting recognition by visual sensation of an operating state of the electronic apparatus, detecting means for detecting that an operator of the electronic apparatus is viewing the monitor means, and control means for selectively switching and effecting the first operation control mode and the second operation control mode on the basis of an output of the detecting means.

In an electronic apparatus arranged as another preferred embodiment of this invention, the above-stated first operation control mode is a mode in which a normal operation of the electronic apparatus is allowed to be performed and the above-stated second operation control mode is a mode in which each of a plurality of functions included in the electronic apparatus is sequentially effected for a predetermined period of time.

An electronic apparatus arranged as a further preferred embodiment of this invention to permit switching between a first operation control mode in which a normal operation of a video camera is allowed to be performed and a second operation control mode in which each of a plurality of functions included in the electronic apparatus is sequentially effected for a predetermined period of time, comprises an electronic viewfinder for permitting recognition by visual sensation of an operating state of the electronic apparatus, detecting means for detecting that an operator of the electronic apparatus is viewing the electronic viewfinder, and control means for selectively switching and effecting the first operation control mode and the second operation control mode on the basis of an output of the detecting means.

Further, to attain the above-stated objects, an electronic apparatus arranged as a still further preferred embodiment of this invention to have a plurality of operation modes and to be capable of individually effecting each of the plurality of operation modes, comprises mode executing means for executing the plurality of operation modes in accordance with a predetermined procedure, determining means for determining whether the electronic apparatus is being held by an operator of the electronic apparatus, and control means for controlling the mode executing means on the basis of an output of the determining means so as to stop a mode executing action of the mode executing means when the determining means has determined that the electronic apparatus is being held by the operator.

These and other objects and features of this invention will become apparent from the following detailed description of embodiments thereof taken in connection with the accompanying drawings.

BRIEF DESCRIPTION OF THE DRAWINGS

FIGS. 3(a) to 3(c) are flow charts showing processes to be executed in the demonstration mode, such as giving instructions for actions, a procedure for an actual operation on the apparatus and processes of varied kinds to be executed within the system control circuit.

FIG. 7 is a flow chart showing processes to be executed within a lens/camera control circuit.

FIGS. 9(a) to 9(c) show an eye ball image picked up by an image sensor and the waveforms of outputs of the image sensor.

FIGS. 10(a) to 10(n) show in a timing chart the waveforms of signals obtained at various points (a) to (n) of the circuit arrangement shown in FIG. 8.

FIG. 13 is a table showing functions to be executed respectively as digital features.

FIG. 19 shows a camera-shake correcting action of a variable angle prism VAP.

FIG. 24 is a flow chart showing a processing operation of a digital camera-shake correction processing circuit included in the block diagram of FIG. 23.

DETAILED DESCRIPTION OF THE PREFERRED EMBODIMENTS

The details of the electronic apparatus of this invention are described below through preferred embodiments thereof with reference to the accompanying drawings.

(First Embodiment)

Figure 4:
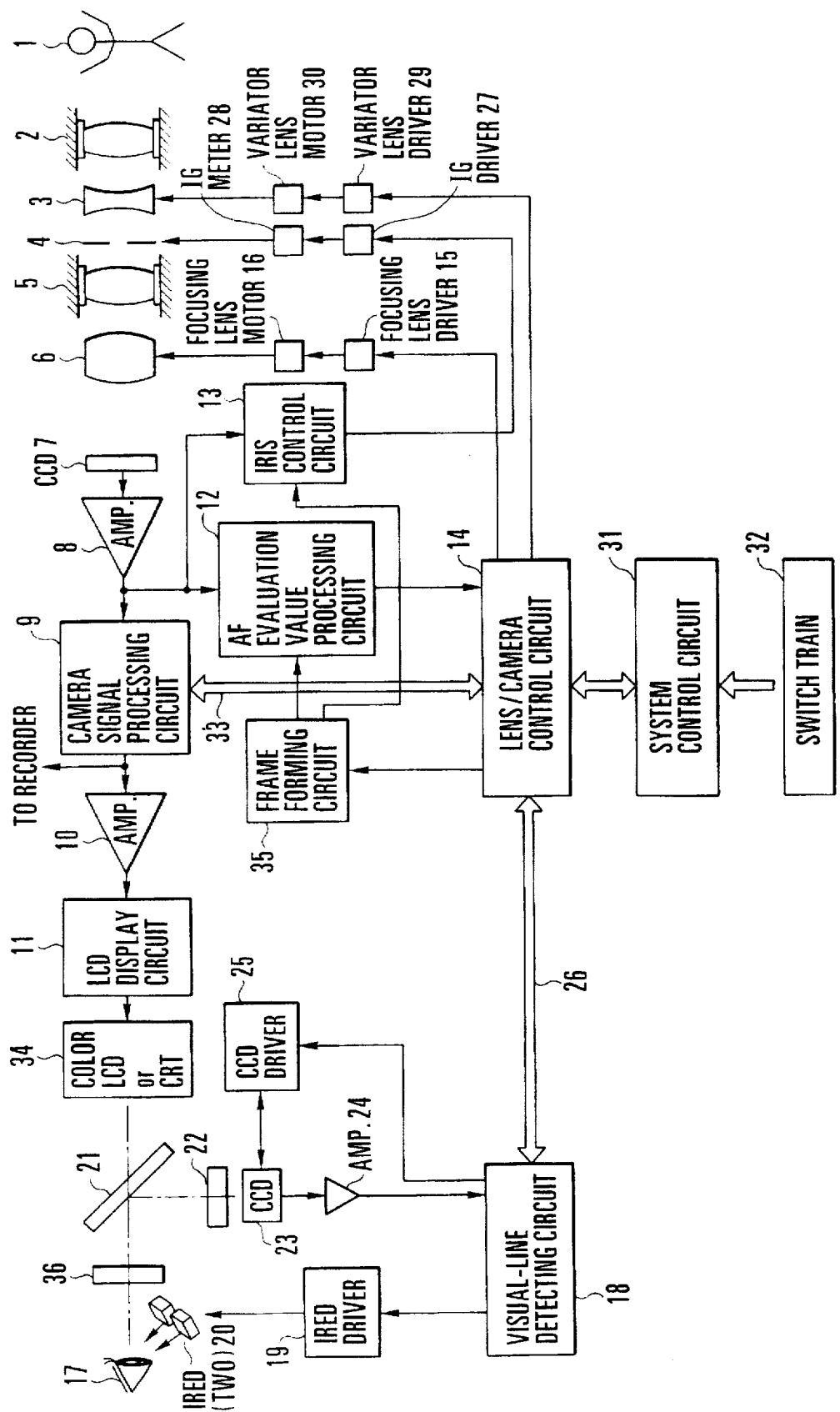
FIG. 4 is a block diagram showing the arrangement of a first embodiment of this invention.

FIG. 4 shows the fundamental arrangement of a VTR-integrated type camera including a camera part and parts disposed therearound. Referring to FIG. 4, the eye 17 of the operator of the camera is looking at an LCD (liquid crystal display) monitor 34 disposed inside an electronic viewfinder (hereinafter referred to as EVF) which is mounted on the VTR-integrated type camera. The eye 17 is illuminated with infrared light rays coming from infrared emitting diodes (hereinafter referred to as IREDs) 20. The IREDs 20 are arranged to be driven by an IRED driver 19 under the control of a visual-line detecting circuit 18. The infrared light rays emitted from the IREDs 20 are reflected by the eye 17 to be imaged on a CCD (an image sensor) 23 through an eyepiece 36, a dichroic mirror 21 which changes only the optical path of the infrared light rays and an image forming lens 22. The CCD 23 is arranged to be driven by a CCD driver 25. The CCD driver 25 is controlled by the visual-line detecting circuit 18 with respect to the period of reading from the CCD 23. Information read out from the CCD 23 is supplied through an amplifier 24 to the visual-line detecting circuit 18.

FIG. 9(a) shows the video image of the eye 17 formed on the image pickup plane of the CCD 23. The visual-line detecting circuit 18 supplies a reading control signal to the CCD driver 25. In accordance with the reading control signal, the image is horizontally scanned as indicated by a reference numeral 301. Information is thus taken in from each of picture elements of the CCD 23 one by one. Then, the image formed on the CCD 23 is processed in such a way as to detect the position of the visual line of the operator. Information on the position of the visual line is outputted from the visual-line detecting circuit 18.

Referring again to FIG. 4, the illustration includes an object of shooting 1. An image of the object 1 is formed on the image pickup plane of an image sensor 7 which is composed of a CCD or the like, through a photo-taking optical system which is composed of a fixed first lens group 2, a variator lens 3, an iris 4, a fixed third lens group 5 and a focusing lens 6. The object image formed on the image sensor 7 is photo-electrically converted. A video signal obtained as a result of the photo-electric conversion is supplied through an amplifier 8 to a camera signal processing circuit 9. At the camera signal processing circuit 9, the video signal is subjected to a predetermined signal processing action to be converted into a standardized video signal. The signal thus processed by the camera signal processing circuit 9 is supplied through an amplifier 10 to an LCD display circuit 11. Upon receipt of the processed signal, the LCD display circuit 11 causes an LCD monitor 34 serving as monitor means to display the signal as a video image picked up.

Meanwhile, the output of the amplifier 8 is supplied also to an AF evaluation value processing circuit 12 and an iris control circuit 13. The AF evaluation value processing circuit 12 is arranged to output an AF evaluation value signal which is, for example, a high frequency component which shows a maximum value when the sharpest focused state of the image picked up is obtained.

The iris control circuit 13 is arranged to compare the luminance level of the input video signal with a predetermined reference level. The degree of exposure is detected by the result of the comparison. The iris control circuit 13 then provides an IG driver 27 with a signal for adjusting the aperture position of the iris 4 to a position at which the degree of exposure become apposite. In accordance with this signal, the IG driver 27 drives an IG meter 28 to adjust the amount of aperture of the iris 4. A lens/camera control circuit 14 is arranged to control a focusing lens driver 15 in such a way as to cause the focusing lens driver 15 to drive a focusing lens motor 16 to move the focusing lens 6 to a position where the AF evaluation value reaches a maximum value.

The lens/camera control circuit 14 is arranged also to supply, in response to an operation on a magnifying power varying switch (not shown) by the operator, a control signal to a variator lens driver 29. In accordance with this control signal, the variator lens driver 29 drives a variator lens motor 30 to move the variator lens 3.

The lens/camera control circuit 14 is further arranged to output a frame control signal which indicates the position and range of a distance-and-light measuring frame. Upon receipt of the frame control signal, a frame forming circuit 35 supplies control signals to the AF evaluation value processing circuit 12 and the iris control circuit 13 for setting, within the image pickup plane, a range from which the evaluation value can be taken in, i.e., the distance-and-light measuring frame.

The position of the above-stated frame varies with the position of the visual line detected by the visual-line detecting circuit 18. An information transmitting route 26 is arranged to supply information on the position of the visual line to the lens/camera control circuit 14.

A system control circuit 31 is a microcomputer arranged to control the whole VTR-incorporated type camera. A switch train 32 is connected to the system control circuit 31. A plurality of functions including the digital features whereby special effects are attainable by digitally processing images as shown in FIG. 13 can be selectively performed with the switch train 32 operated by the operator. An information transmitting route 33 is arranged between the lens/camera control circuit 14 and the camera signal processing circuit 9.

Figure 5:
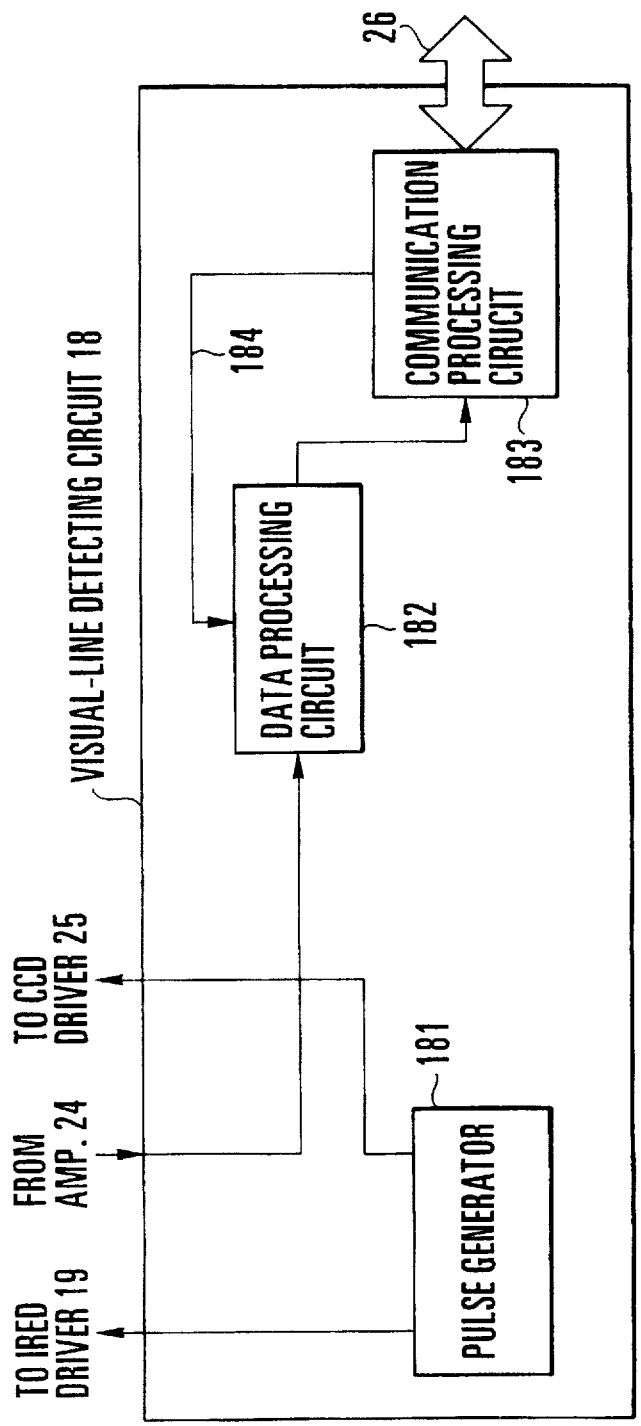
FIG. 5 is a block diagram showing the details of a visual-line detecting circuit arranged in the first embodiment of this invention.

FIG. 5 shows the fundamental arrangement of the inside of the visual-line detecting circuit 18. Referring to FIG. 5, a pulse generator 181 is arranged to generate pulses for driving the IRED driver 19 and the CCD driver 25. A data processing circuit 182 is arranged to receive a signal (information read out from the CCD 23) from the amplifier 24. This signal is data-processed to detect the position of the visual line as coordinates. A communication processing circuit 183 is provided for communication with the lens/camera control circuit 14 and is arranged to perform a process required for placing on the information transmitting route 26 the visual-line position coordinates outputted from the data processing circuit 182. There is provided a control line 184 which is arranged to indicate that an instruction is issued from the visual-line detecting circuit 18 to make calibration for detection of the visual line.

Figure 6A:
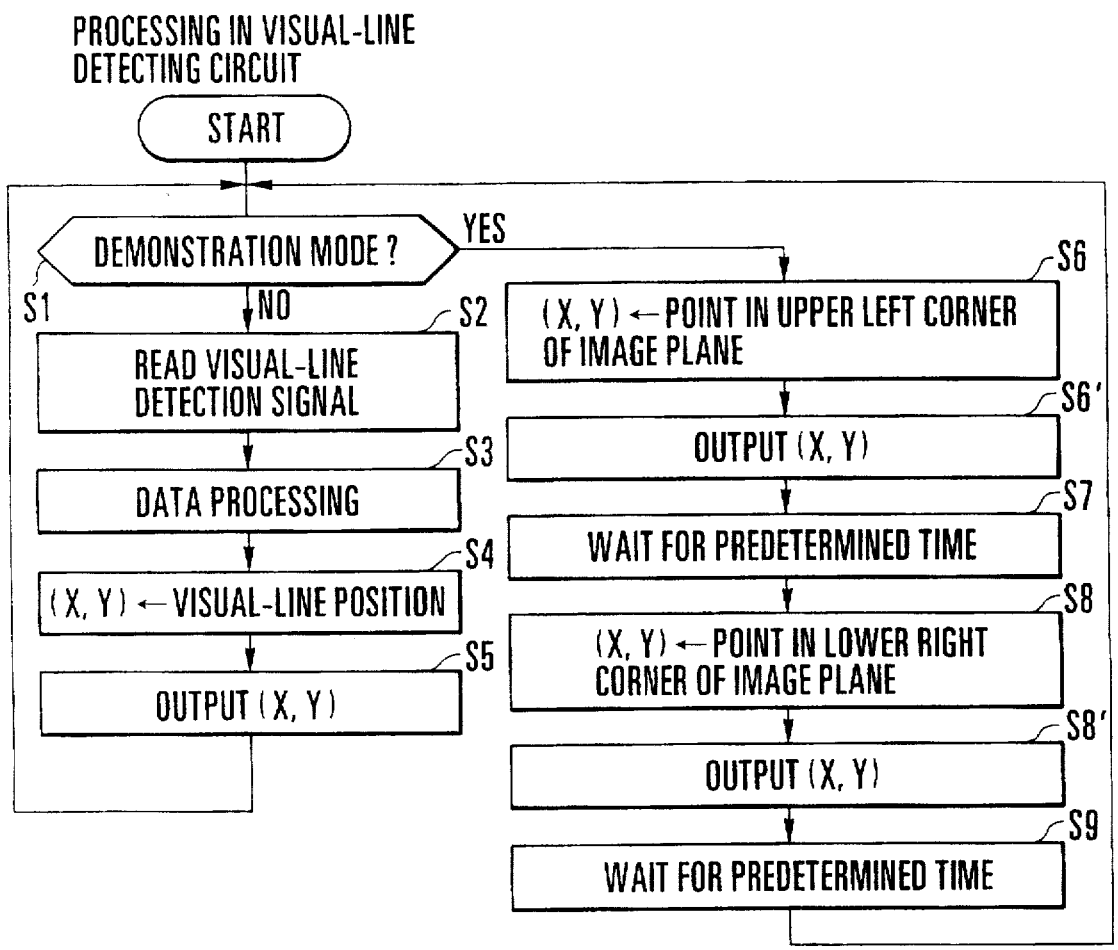
FIGS. 6(a) and 6(b) show processes to be executed by the visual-line detecting circuit and a state of an electronic viewfinder image plane obtained when these processes are executed.
Figure 6B:
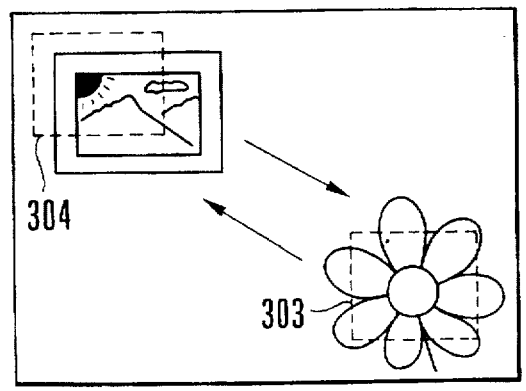

FIG. 6(a) is a flow chart showing the basic steps of a data processing operation to be executed within the data processing circuit 182. At a step S1, a signal indicating whether the camera is in a demonstration mode (a second operation control mode according to this invention) or not is read from the lens/camera control circuit 14 through the information transmitting route 26. If the signal does not indicate the demonstration mode, the flow of operation comes to a step S2. At the step S2, a visual-line detection signal is read out from the amplifier 24. At a step S3, the position of the visual line within the image plane is analyzed. At a step S4, the visual-line position is converted into coordinate information. At a step S5, the coordinate information is supplied to the communication processing circuit 183. At a step S6, in the case of the demonstration mode, position coordinates which correspond to the position of the center of a frame 304 shown in FIG. 6(b) are defined and outputted at a step S6'. At a step S7, the flow of operation waits for a predetermined period of time. After the lapse of this waiting time, the flow comes to a step S8. At the step S8, position coordinates which correspond to the position of the center of another frame 303 shown in FIG. 6(b) are defined and outputted at a step S8'. At a step S9, the flow of operation waits for a predetermined period of time. After the lapse of that waiting time, the flow comes back to the process of the step S1.

Thus, in the case of the demonstration mode, the flow of operation repeats a process of reciprocating between the positions of the two frames 304 and 303.

FIG. 7 is a flow chart showing basic processes to be performed then within the lens/camera control circuit 14. At a step S12 of FIG. 7, a signal from the system control circuit 31 is checked to find if the signal is for the demonstration mode. If not, the flow of operation comes to the process of a step S13 which corresponds to a first operation control mode according to this invention. At the step S13, a check is made to find if an instruction for execution of some of the processes of the digital features of varied kinds shown in FIG. 13 has been given by operating the switch train 32 and information on this has been received from the system control circuit 31. If so, the flow of operation comes to a step S20. At the step S20, the digital feature process for which the instruction has been given by operating the switch train 32 is selected. At a step S21 the process of the digital feature selected is executed.

In a case where it is confirmed at the step S13 that no instruction is given for any digital feature process, the flow comes to a step S14 to stop executing any digital feature process. At a step S15, information on the coordinates of the visual-line position transmitted from the visual-line detecting circuit 18 is read. At a step S16, the information on the coordinates is supplied to the frame forming circuit 35 to have the frame moved to a position corresponding to the coordinates. At a step S17, a signal outputted from the AF evaluation value processing circuit 12 is read as a focus signal indicating a degree of focusing obtained within the frame. At a step S18, the degree of focusing is determined on the basis of the focus signal. At a step S19, a lens control signal is supplied to the focusing lens driver 15. If, at the step S12, the signal from the system control circuit 31 is found to indicate the demonstration mode, the flow of operation comes to a step S22 for the purpose of demonstrating functions of varied kinds one after another. At the step S22, a check is first made for the lapse of a frame moving demonstration time predetermined for demonstrating a function of focusing on an object located within the distance measuring frame (a focus detecting area) by moving the frame. If the frame moving demonstration time is found not yet elapsed, the flow of operation comes to a step S25. At the step S25, the time is counted and the AF action is carried out through the series of steps beginning with the step S15. The shift of focus taking place as the position of the frame reciprocates as shown in FIG. 6(b) is demonstrated until the lapse of the frame moving demonstration time.

Upon confirmation of the lapse of the frame moving demonstration time at the step S22, the flow comes to a step S23. At the step S23, the position of the distance measuring frame is set at the center of the image plane before execution of the processes of the various digital features. At a step S24, a check is made to find if the digital feature number N which is as shown in FIG. 13 has reached "10" which indicates the last of a total of ten kinds of digital feature processes, as shown in FIG. 13. If not, the flow comes to a step S26 to have the number N incremented by one. At a step S27, a digital feature process corresponding to the number N of FIG. 13 is executed. At steps S28 and S29, time is counted for carrying out one digital feature process within the predetermined period of time. Then, the AF action is carried out by executing the processes of a series of steps beginning with the step S16. When, at the step S28, the digital feature process is found to have been executed in the predetermined period of time, the flow of operation comes to a step S30. At the step S30, the time counter is cleared, and the execution of the N-th digital feature process is brought to a stop at a step S31. When all the digital feature processes of the ten kinds are found to have been executed at the step S24, the flow comes to a step S32 to set the number N at "0". The flow then comes to a step S33 to clear a frame moving demonstration time counter. With the frame moving demonstration time counter reset at the step S33, the flow comes to resume the operation from the frame moving demonstration through the step S12.

Figure 14:
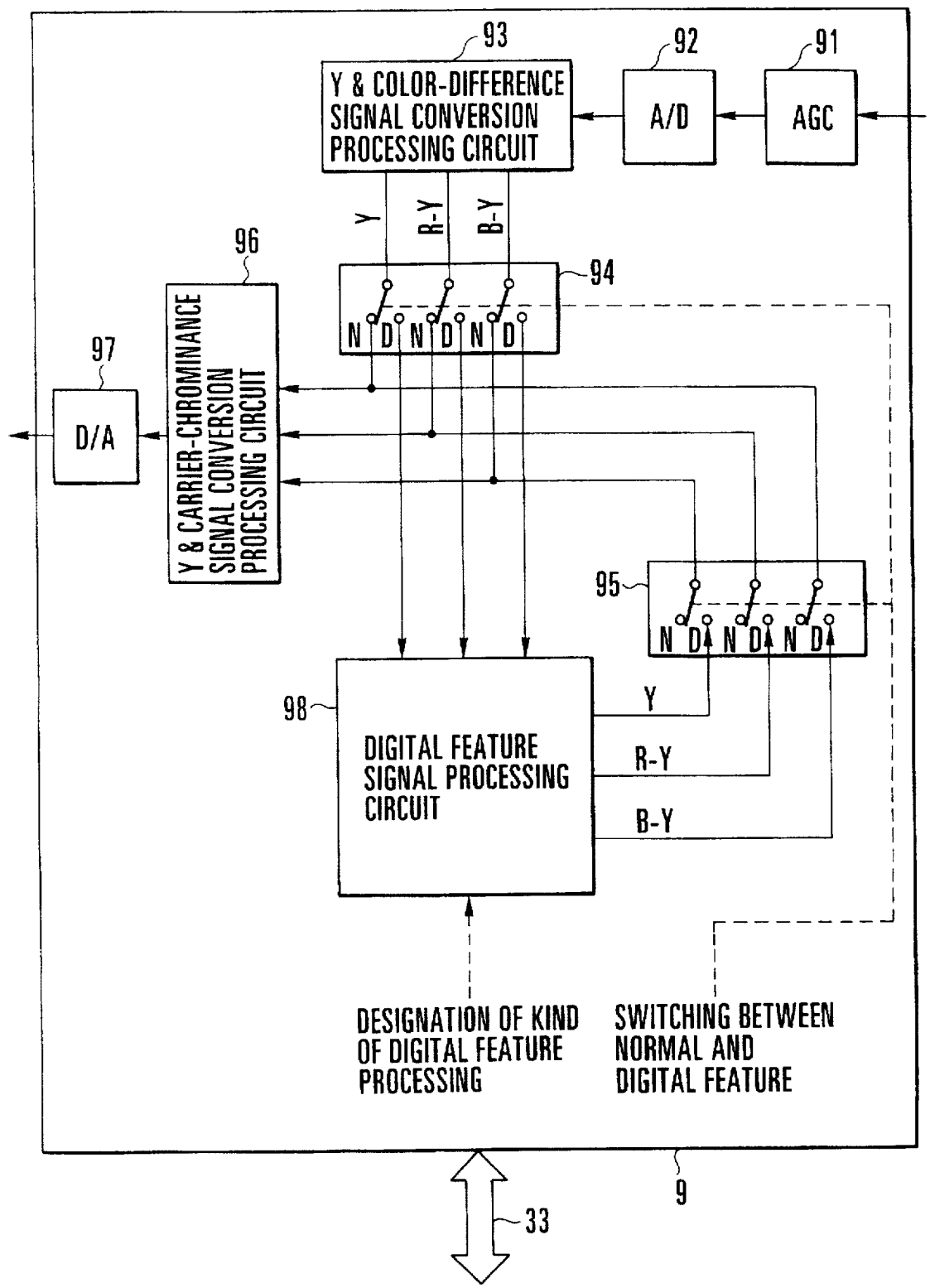
FIG. 14 is a block diagram showing a circuit arranged to execute the digital features.

The details of the camera signal processing circuit 9 which is arranged to execute the digital feature processes are as follows. FIG. 14 is a block diagram showing the internal arrangement of the camera signal processing circuit 9. Referring to FIG. 14, the video signal from the amplifier 8 comes through an AGC circuit 91 to be A/D-converted by an A/D converter 92.

A Y and color-difference signal conversion processing circuit 93 is arranged to convert the signal outputted from the A/D converter 92 into a luminance signal Y and color-difference signals. Switch trains 94 and 95 are arranged to perform switching to decide whether or not the digital feature processes are to be performed. The operations of the switch trains 94 and 95 are controlled, by the process of the step S13 of the flow chart of FIG. 7, on the basis of information received from the system control circuit 31 about whether or not an instruction for execution of a digital feature process is given. If the instruction for execution of a digital feature is given, the switching position of each of these switches is shifted to a terminal D and, if not, the switching position is shifted to another terminal N, as shown in FIG. 14.

In a case where the switch train 94 is shifted to the switch terminals N, the signals are not supplied to a digital feature signal processing circuit 98 but are supplied directly to a Y and carrier chrominance signal conversion processing circuit 96. The color-difference signals are then converted into a carrier chrominance signal. The carrier chrominance signal is superimposed on the luminance signal Y. A signal thus obtained is D/A (digital-to-analog)-converted by a D/A converter 97 and outputted from the camera signal processing circuit 9 as an analog signal. Further, with the other switch train 95 also shifted to the switch terminals N, the output of the digital feature signal processing circuit 98 is open.

When the switch train 94 is shifted to the switch terminals D, the signals outputted from the Y and color-difference signal conversion processing circuit 93 are supplied to the digital feature signal processing circuit 98. The signals are then subjected to a digital feature process of the kind designated by the lens/camera control circuit 14 through the information transmitting route 33. The signals thus processed are then supplied through the switch train 95 to the Y and carrier chrominance signal conversion processing circuit 96 to be outputted and supplied to a recorder and the amplifier 10.

Figure 8:
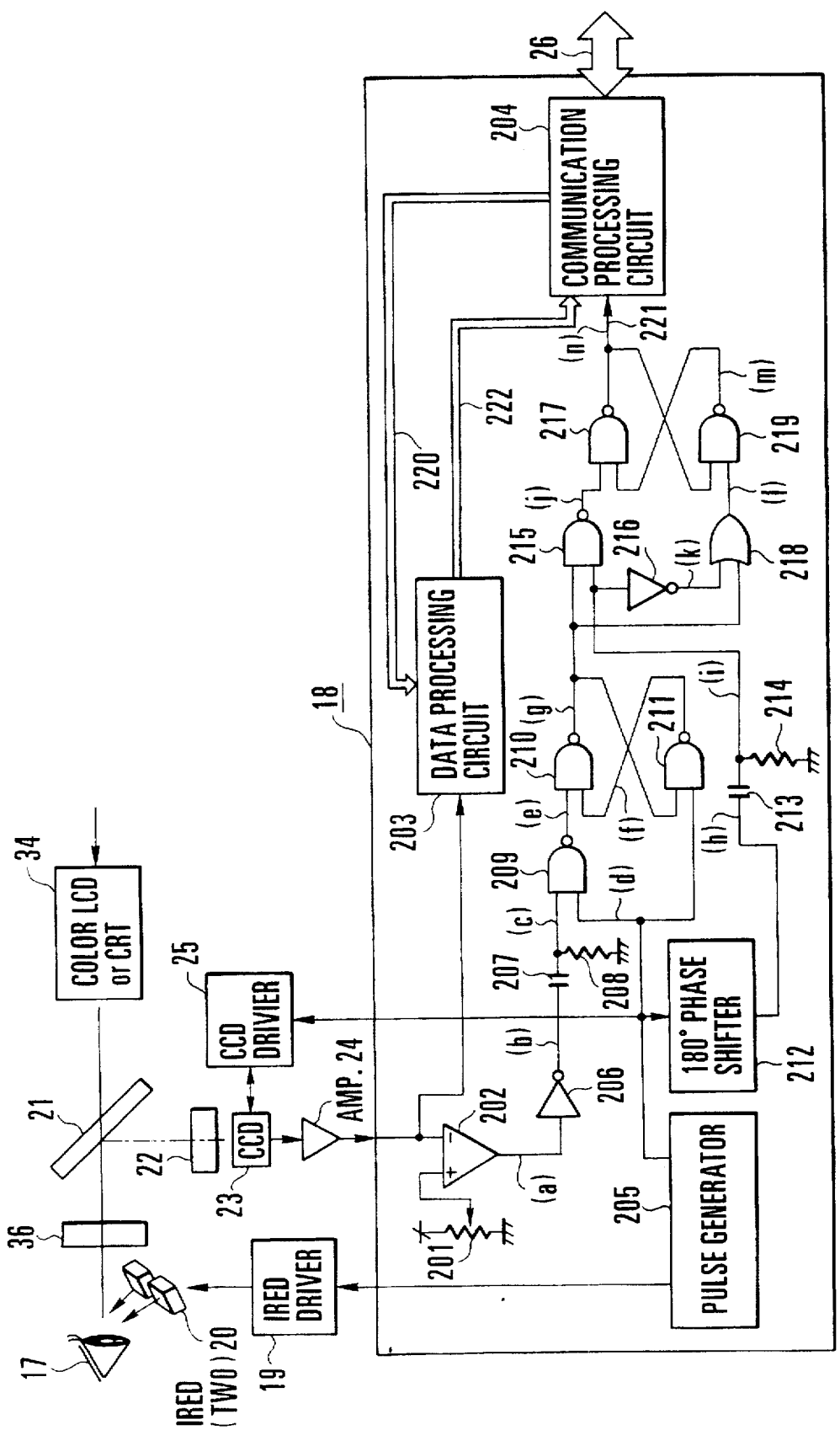
FIG. 8 is a block diagram showing a detecting means arranged in the visual-line detecting circuit of the first embodiment to detect whether or not an operator of the apparatus is viewing the electronic viewfinder.

FIG. 8 is a block diagram showing an arrangement in which a function of detecting whether or not the operator is looking into the electronic viewfinder (EVF) is added to the visual-line detecting circuit 18. The arrangement represents detecting means according to this invention.

Referring to FIG. 8, the arrangement includes a data processing circuit 203, a communication processing circuit 204 and a pulse generator 205, which function in basically the same manner as the data processing circuit 182, the communication processing circuit 183 and the pulse generator 181 of FIG. 5.

The data processing circuit 203 is provided with an information input line 220 for receiving information about whether or not it is necessary to make the visual-line calibration and a frame moving instruction for the frame moving demonstration. The communication processing circuit 204 is provided with an information input line 221 for receiving information about whether or not the operator is looking into the EVF and another information input line 222 for receiving from the data processing circuit 203 information about completion of the defining action on the visual-line position coordinates and about completion of the visual-line calibration.

FIG. 8 also shows logic circuit parts which are provided for detecting whether or not the operator is looking into the EVF. The detecting operations of these logic circuit parts are described together with changes taking place in signal waveform at each of points (a) to (n) shown in the drawing, as follows.

FIG. 9(c) shows a signal indicating the period of horizontal scanning made by the CCD driver 25. FIG. 9(b) shows a part of the signal outputted from the amplifier 24 corresponding to one horizontal scanning period. The level of this signal varies with the quantity of light reflected from the eyeball of the operator. The level of the signal is high at the white of the eye and low at the iris and pupil of the eye.

FIGS. 10(a) to 10(n) show in a timing chart the signal waveform appearing at each of the various points (a) to (n) which are indicated in FIG. 8. The output of a differential amplifier 202 becomes a pulse signal waveform as shown in FIG. 10(a) by slicing the output signal of the amplifier 24 according to a level set by a slicer 201 which is connected to the non-inverting terminal of the differential amplifier 202.

FIG. 10(b) shows a pulse signal waveform obtained by inverting the pulse signal waveform of FIG. 10(a) by means of an inverter 206. This pulse signal waveform is differentiated into a differential waveform as shown in FIG. 10(c) by a differentiating circuit composed of a capacitor 207 and a resistor 208. The differential waveform is supplied to a NAND circuit 209.

In other words, when the operator is looking into the EVF (electronic viewfinder) to have an image of the eye picked up by the CCD 23, the rising edge of the waveform is detected at the left edge of the eyeball as shown in FIG. 10(c).

With the signal waveforms of FIGS. 10(c) and 10(d) inputted to the NAND circuit 209, a pulse signal waveform which varies only when the image of the eyeball is picked up by the CCD 23 can be obtained as shown in FIG. 10(e).

FIG. 10(g) shows a signal waveform obtained by latching the signal of the signal waveform of FIG. 10(e) for one horizontal scanning period. FIG. 10(h) shows a signal waveform obtained with the phase of a signal waveform outputted from the pulse generator 205 as shown in FIG. 10(d) shifted 180 degrees by means of a 180° phase shifter 212. FIG. 10(i) shows a differential waveform obtained by differentiating this phase shifted signal-waveform by means of a differentiating circuit composed of a capacitor 213 and a resistor 214.

With the pulse signal waveforms of FIGS. 10(g) and 10(i) supplied to a NAND circuit 215, a signal which is latched every horizontal scanning period as shown in FIG. 10(j) is obtained when the signal waveform of FIG. 10(e) is varying.

The signal waveform of FIG. 10(j) is latched by NAND circuits 217 and 219. As a result, a signal waveform which becomes a high level when the image of the eyeball of the operator is picked up by the CCD 23 is obtained, as shown in FIG. 10(n).

The signal waveform of FIG. 10(n) is arranged to be reset by means of a signal of FIG. 10(l) which varies when the CCD 23 ceases to pick up the eyeball image. The signal waveform of FIG. 10(n) is put on the communication processing circuit 204, so that information indicating whether the operator is looking into the EVF or not can be transmitted to the lens/camera control circuit 14 through the information transmitting route 26.

Figure 1:
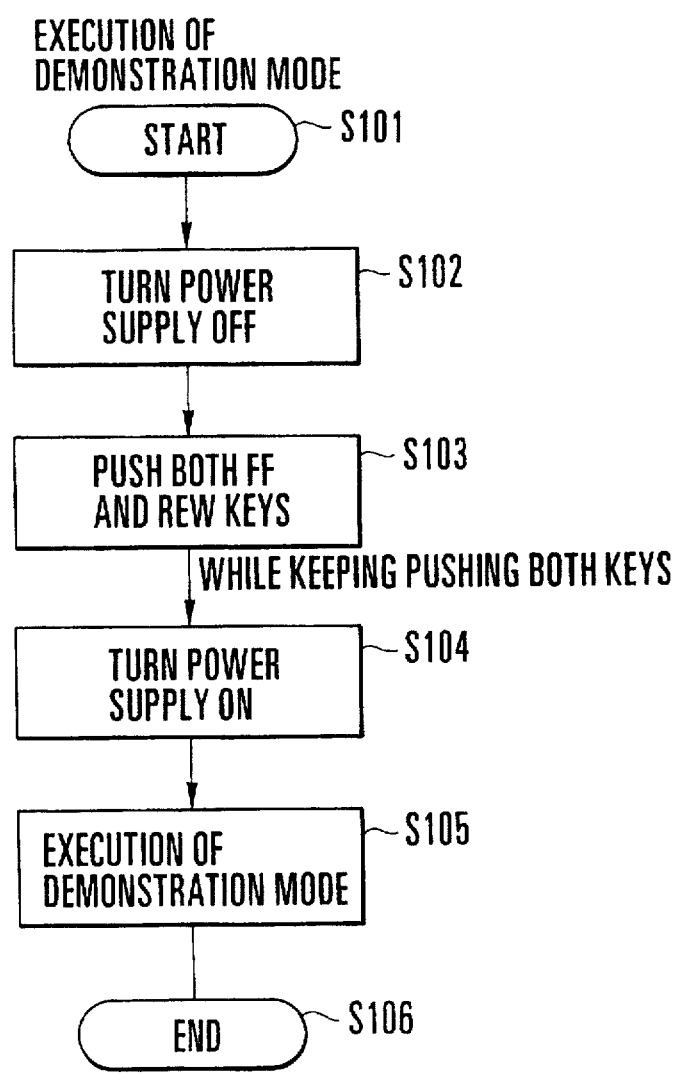
FIG. 1 is a flow chart showing processes for performing a demonstration mode.
Figure 2:
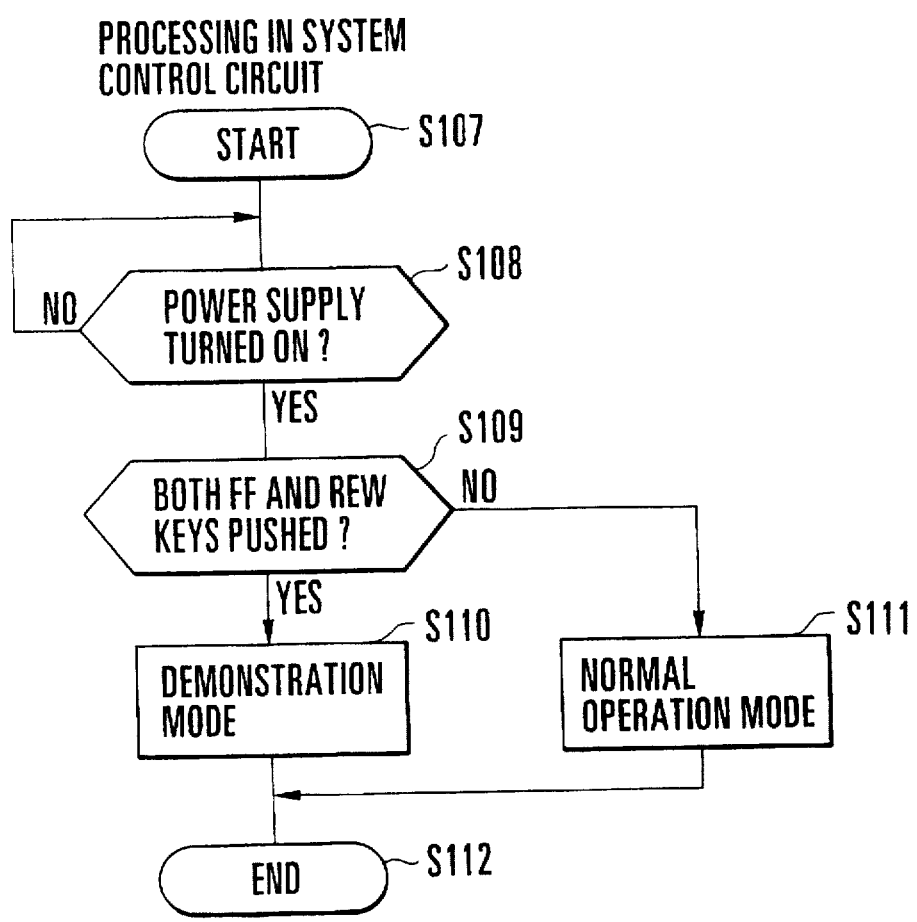
FIG. 2 is a flow chart showing processes to be executed within a system control circuit.
Figure 11:
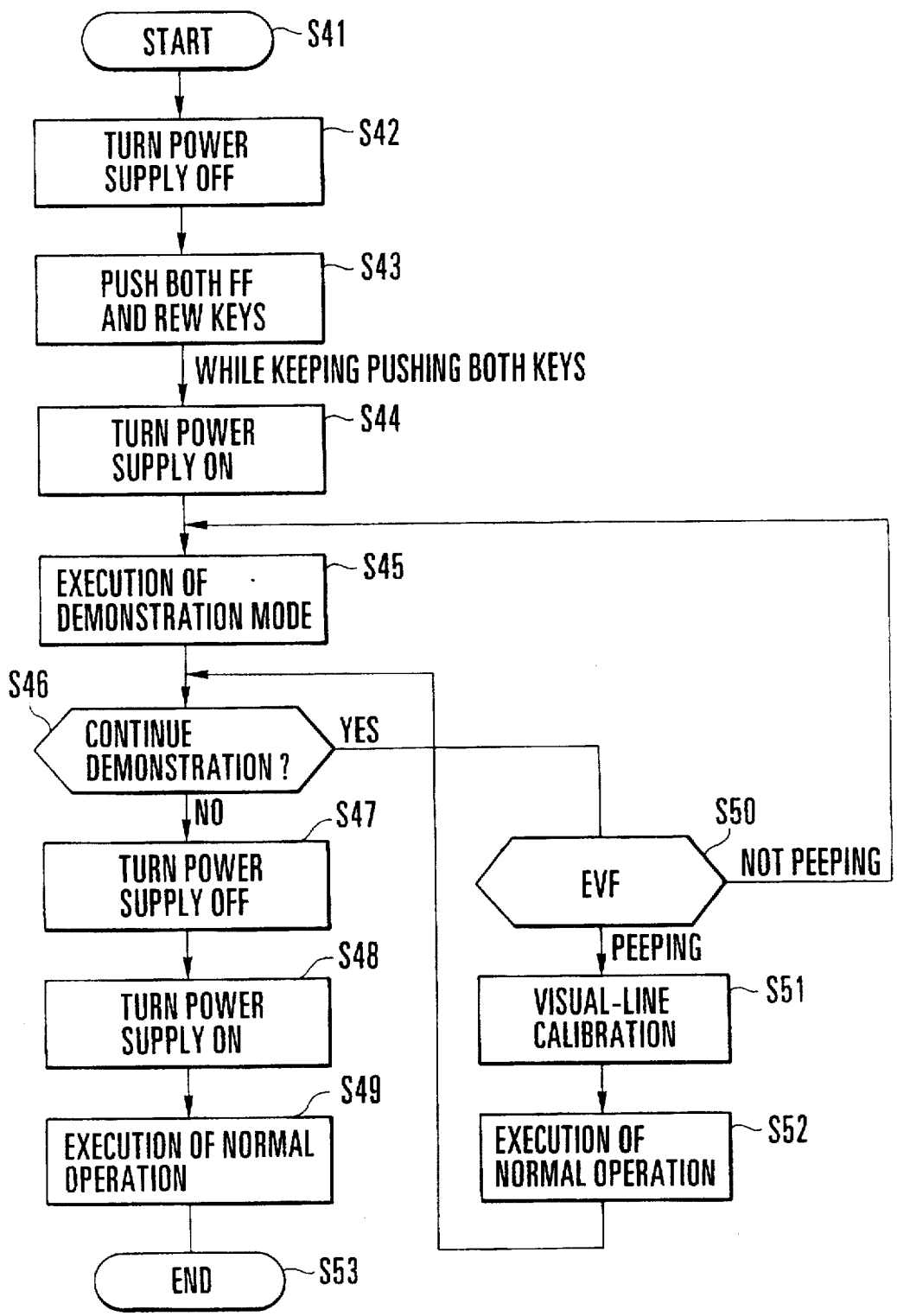
FIG. 11 is a flow chart showing the processes of executing the demonstration mode.

FIG. 11 is a flow chart showing an operating procedure to be taken by the operator of a VTR-integrated type camera to which this invention is applied. In this flow chart, the processes of steps from S41 to S44 are identical with those of the steps S101 to S105 of FIG. 1 and are, therefore, omitted from description.

At a step S46 of FIG. 11, selection is made between continuing and not continuing the demonstration. If it is decided to continue the demonstration, the flow comes to a step S50. At the step S50, selection is made between looking into and not looking into the EVF. If not, the flow comes back to the step S45 to allow the execution of the demonstration mode to continue.

Figure 3C:
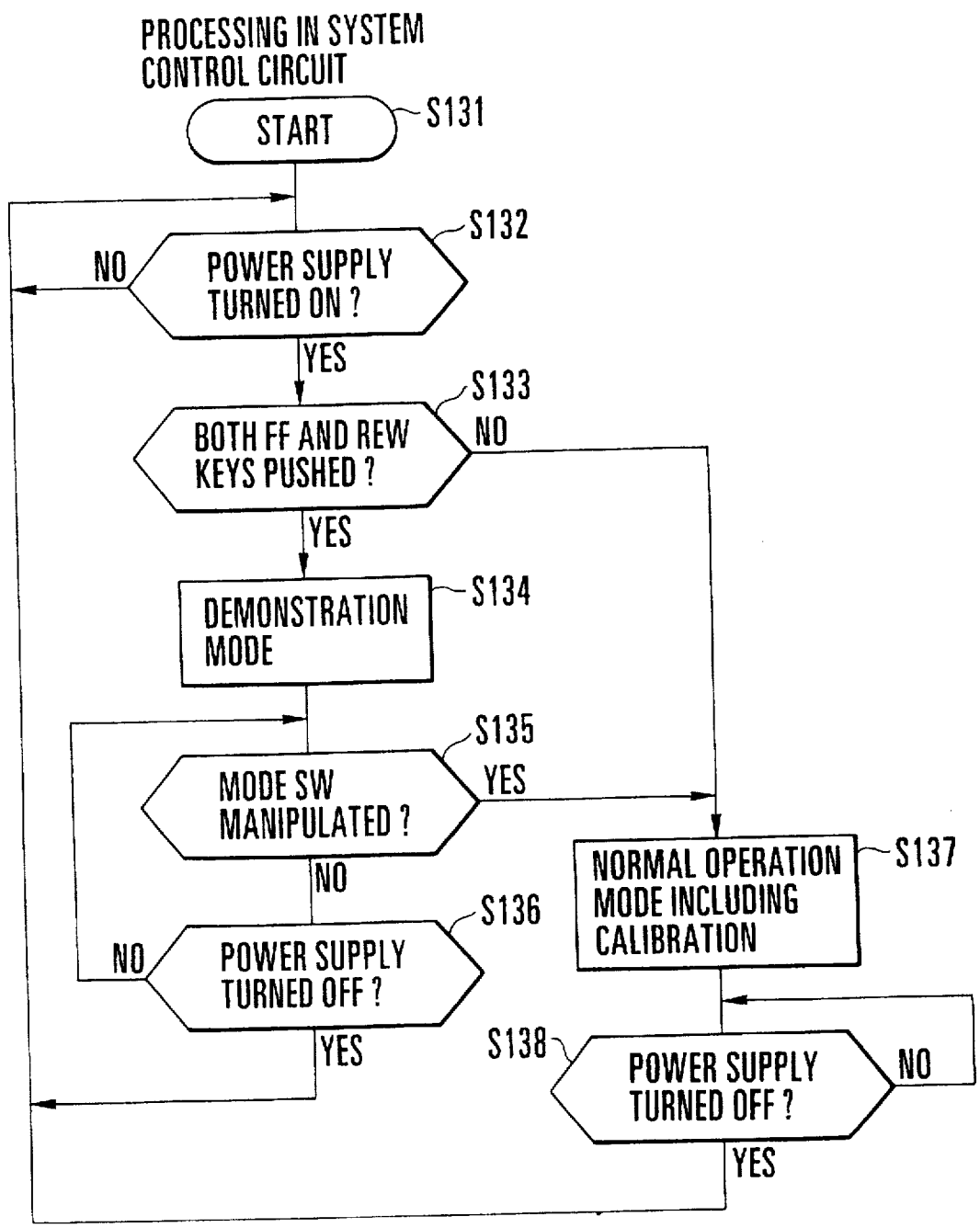

If the operator looks into the EVF at the step S50, the flow comes to a step S51 to perform the visual-line calibration in the same manner as shown at the parts 142 and 143 in FIG. 3(b).

Then, the lens/camera control circuit 14 of FIG. 4 sends out information indicative of the visual-line calibration mode to the visual-line detecting circuit 18 through the information transmitting route 26. The information is then transmitted, within the visual-line detecting circuit 18, to the data processing circuit 203 via the communication processing circuit 204 and the information input line 220. At the step S51, the visual-line calibration is performed by the data processing circuit 203.

Upon completion of the visual-line calibration, the data processing circuit 203 sends out information about the completion to the communication processing circuit 204 via the information input line 222. The information is further sent to the lens/camera control circuit 14 via the information transmitting route 26. In response to the information, the lens/camera control circuit 14 shifts the mode of operation to a normal operation mode. This enables the operator to try the normal operation at a step S52.

After the step S52, if the eye of the operator is found to have detached from the EVF at the step S50, the flow of operation comes back to the step S46 to resume execution of the demonstration mode.

In bringing the demonstration mode to an end, instead of suspending the demonstration mode, the flow comes to a step S47. At the step S47, a power supply is temporarily turned off. At a step S48, the power supply is again turned on without pushing the FF and REW keys. At a step S49, the normal operation is executed as desired.

This embodiment has been described above on the assumption that the visual-line calibration is to be performed by giving an instruction and effecting processes within the visual-line detecting circuit 18.

Further, the system control circuit 31 keeps informing the lens/camera control circuit that the camera is in the demonstration mode. In other words, the system control circuit 31 controls and causes the lens/camera control circuit 14 to make the visual-line calibration while the demonstration is in process, if the camera is in the demonstration mode and the operator is looking into the EVF. After that, the normal operation is performed, and the operation comes back to execute the demonstration mode when the operator ceases to look into the EVF.

Figure 12:
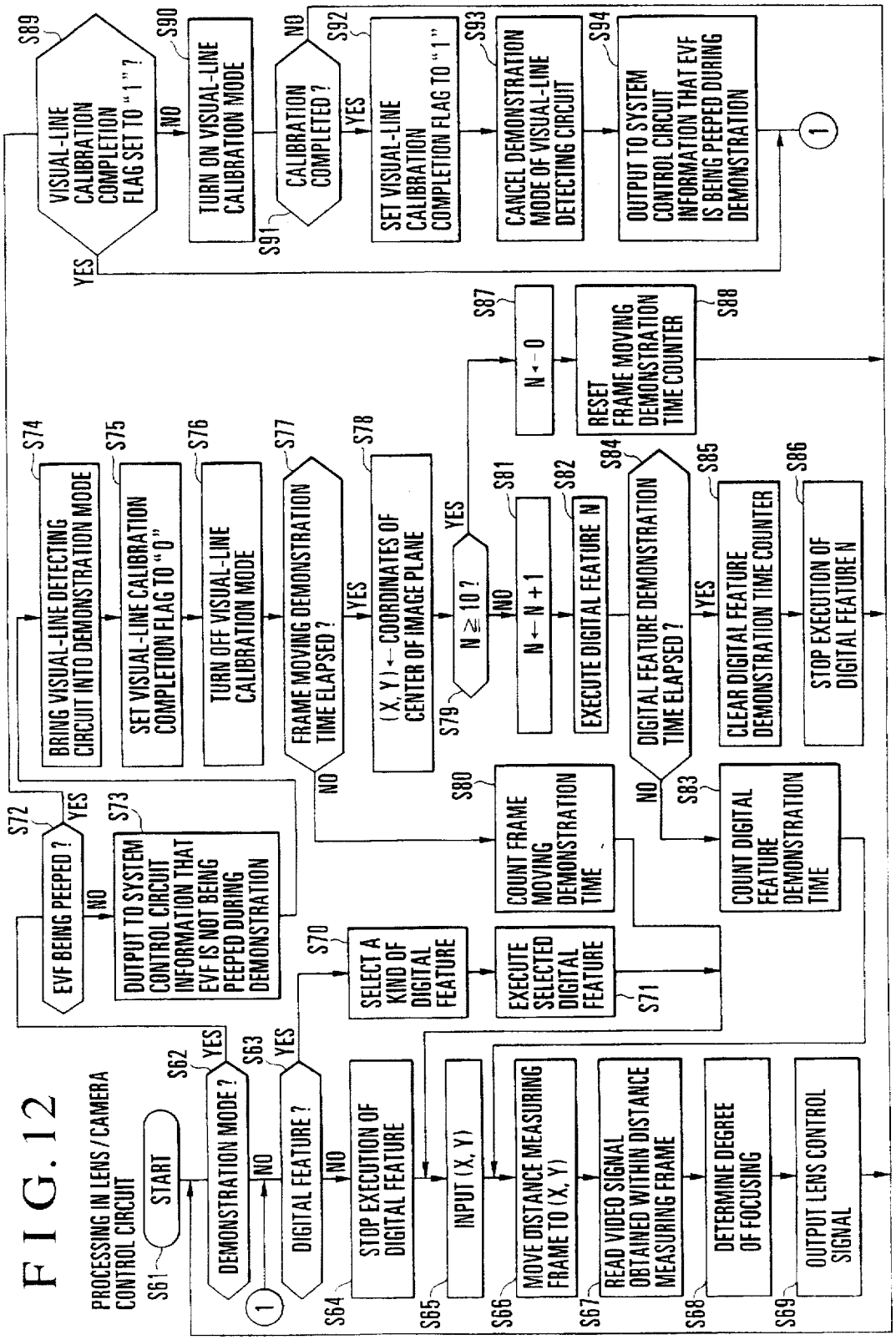
FIG. 12 is a flow chart showing processes to be executed within the lens/camera control circuit.

FIG. 12 is a flow chart showing processes to be executed within the lens/camera control circuit 14 according to this invention.

Referring to FIG. 12, a check is made at a step S62 to find if the camera is in the demonstration mode. If not, the flow of operation comes to a step S63. At steps S63 to S71, processes are executed in the same manner as in the case of FIG. 7.

In the case of the demonstration mode, the flow comes from the step S62 to a step S72. At the step S72, a check is made to find if information indicating that the operator is looking into the EVF is received from the visual-line detecting circuit 18. If not, the flow comes to a step S73. At the step S73, information indicating that the operator is not looking into the EVF in the demonstration mode is sent to the system control circuit 31. At a step S74, an instruction is sent to the visual-line detecting circuit 18 to execute the process for the movement shown in FIG. 6(b).

At a step S75, a visual-line calibration completion flag which indicates completion of the visual-line calibration is set to "0". At a step S76, an instruction for not executing the visual-line calibration mode is sent to the visual-line detecting circuit 18. At steps S77 to S88, the demonstration mode is executed in the same manner as in the case of FIG. 7.

If it is judged that the operator is looking into the EVF at the step S72, the flow comes to a step S89. At the step S89, a check is made to find if the visual-line calibration completion flag is at "1". If not, the flow comes to a step S90 to send an instruction for execution of the visual-line calibration to the visual-line detecting circuit 18.

At a step S91, the flow of operation waits for input of information indicative of the completion of the visual-line calibration from the visual-line detecting circuit 18. Upon receipt of this information, the flow comes to a step S92 to set the visual-line calibration completion flag to "1".

At a step S93, an instruction for execution of a normal operation is sent to the visual-line detecting circuit 18. At a step S94, information indicating that the operator is looking into the EVF while the demonstration mode is in process of being executed is sent to the system control circuit 31. Then, the flow comes to execute the normal operation processes defined by the steps beginning with the step S63.

After that, since the visual-line calibration completion flag is not cleared as long as the operator continues to look into the EVF, the normal operation is executed. When the eye of the operator detaches from the EVF, the conditions for execution of the demonstration mode are set again by the steps S74, S75 and S76 to allow the demonstration mode to be resumed.

(Second Embodiment)

Another arrangement of the detecting means for detecting whether the operator is looking into the EVF is next described as a second embodiment of this invention. The second embodiment is arranged to make the detection easier than in the case of the first embodiment.

Figure 15:
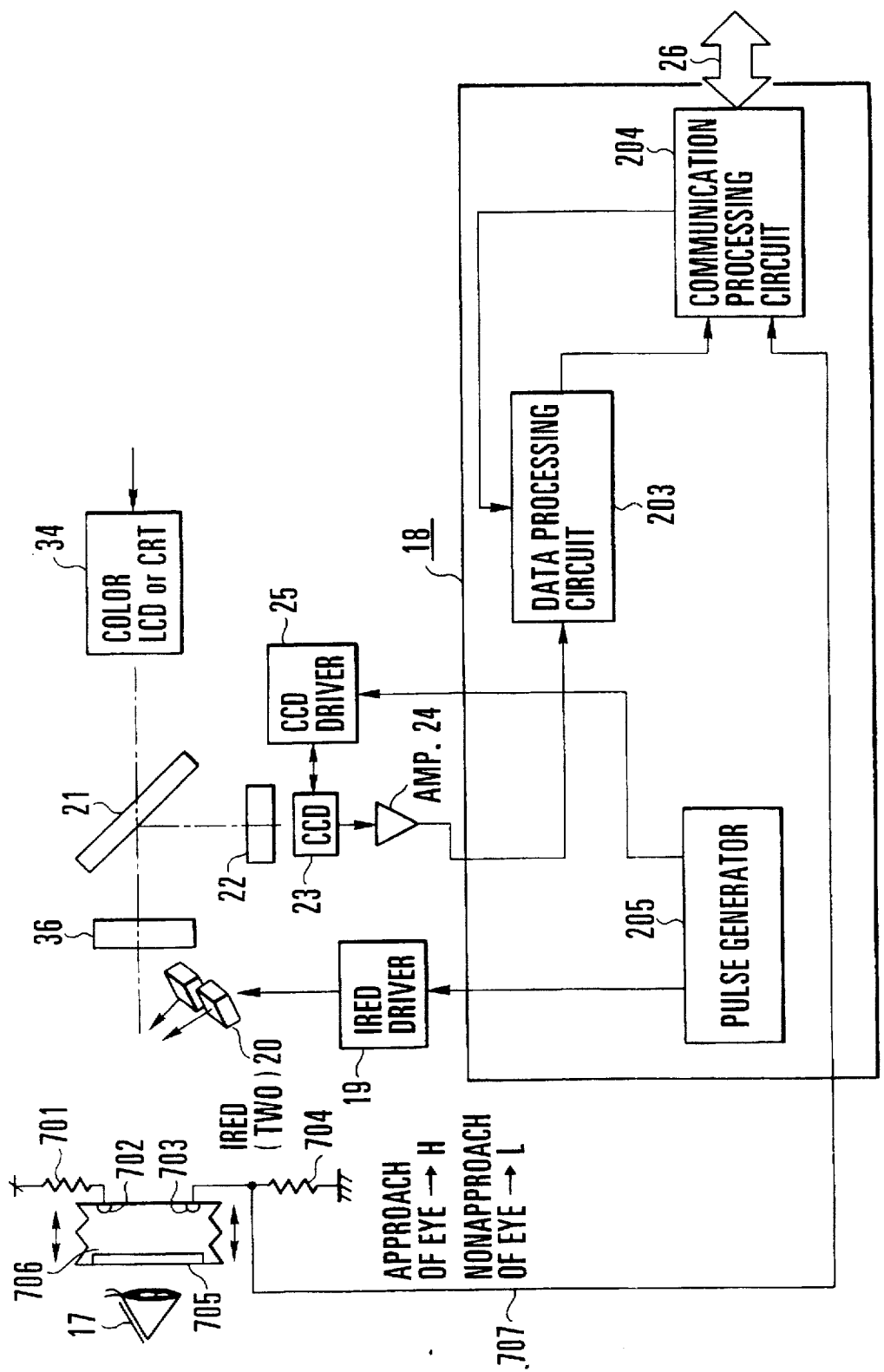
FIG. 15 is a block diagram showing the arrangement of a second embodiment of this invention.

FIG. 15 shows in a block diagram the arrangement of the second embodiment. The arrangement includes a pull-up resistor 701, electric contacts 702, 703 and 705 and a pull-down resistor 704. An eyecup 706 is arranged to be, for example, of a bellows structure. When the eye of the operator comes into contact with the EVF, the eyecup 706 of the bellows structure is pushed to bring the contact 705 into contact with the contacts 702 and 703 to render them conductive. This causes the potential of a line 707 to change from a low (L) level to a high (H) level. Then, information on this change is supplied to the lens/camera control circuit 14 through the communication processing circuit 204 disposed within the visual-line detecting circuit 18 and the information transmitting route 26. The lens/camera control circuit 14 is thus enabled to detect that the operator is looking into the EVF.

In other words, information on a contact state or a noncontact state of the eye can be obtained by making a discrimination between the low and high potentials of the line 707.

All other parts of the second embodiment are arranged in the same manner as the first embodiment and are, therefore, indicated by the same reference numerals in the above description with the details of them omitted.

(Third Embodiment)

A further arrangement for detecting whether the operator is looking into the EVF or not is described below as a third embodiment of this invention.

The approach or nonapproach of the eye to the EVF can be detected by illuminating an opening part of the eyecup of the EVF with an infrared light or the like and detecting the presence or absence of a reflection of the infrared light or the like.

Figure 16:
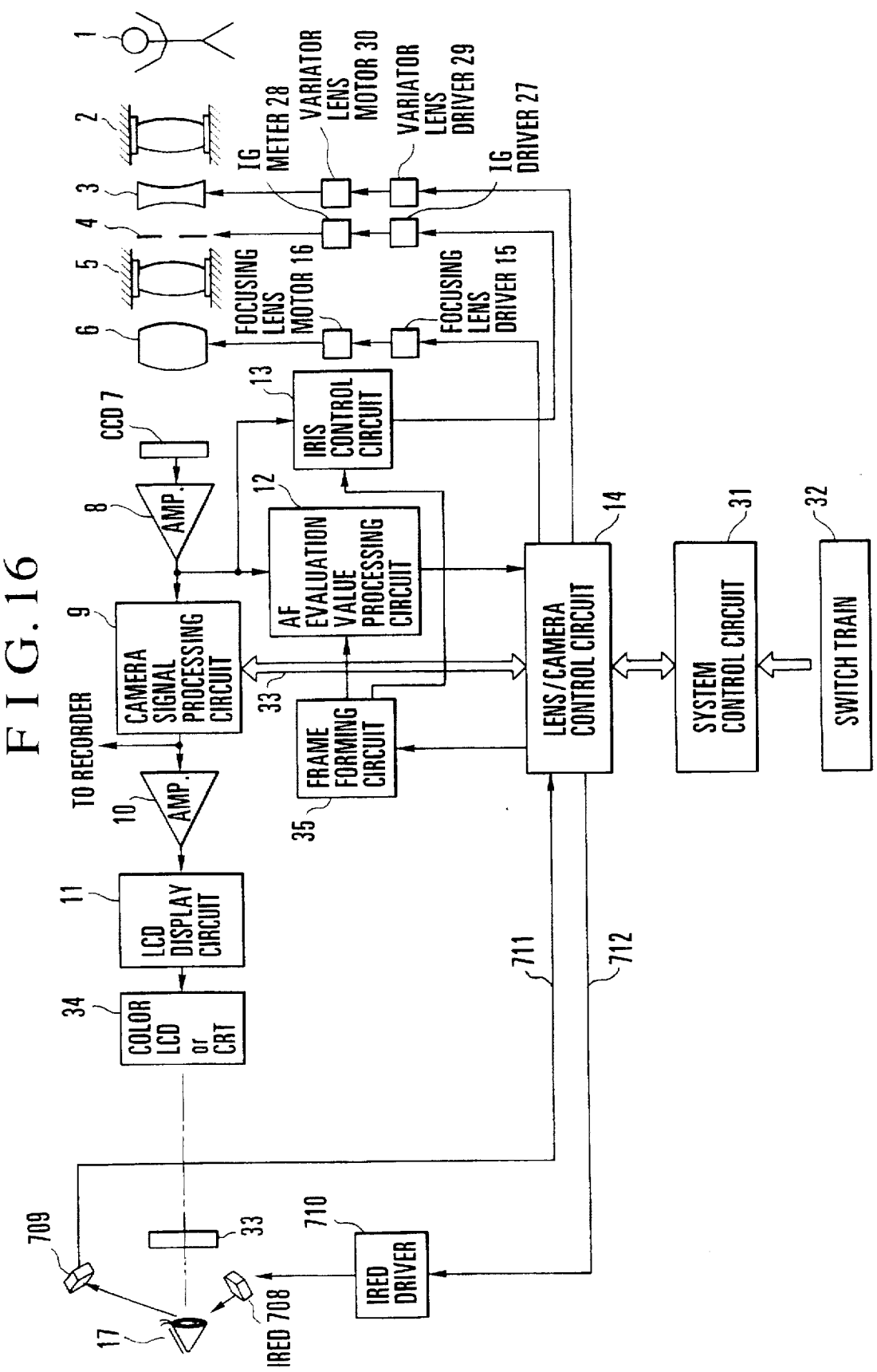
FIG. 16 is a block diagram showing the arrangement of a third embodiment of this invention.

FIG. 16 shows in a block diagram the arrangement of the third embodiment. Referring to FIG. 16, an IRED 708 is caused to emit an infrared light by driving an IRED driver 710 with a control signal supplied via a control line 712 from the lens/camera control circuit 14. The eyeball of the operator looking into the EVF is thus illuminated with the infrared light. A reflection light thus obtained is received by a light receiving element 709. The output of the light receiving element 709 is transmitted via a control line 711 to the lens/camera control circuit 14.

As long as the eye of the operator is in contact with the EVF, a reflection light from the eyeball surface of the eye is received by the light receiving element 709, so that a high (H) level signal is then supplied to the lens/camera control circuit 14. If the eye of the operator is not in contact with the EVF, no reflection light from the eyeball surface is received by the light receiving element 709. Then, the output of the light receiving element 709 remains at a low (L) level.

The lens/camera control circuit 14, therefore, can make a discrimination between a state of having the eye in contact with the EVF and a state of not having the eye in contact with the EVF according to the output of the control line 711, i.e., that of the light receiving element 709.

Further, according to this arrangement, unlike the second embodiment, a discrimination can be made between the contact and noncontact states of the eye without keeping the eyecup in a state of being pushed by the eye of the operator. The third embodiment thus gives a better feeling of operation than the second embodiment.

Further, unlike the first embodiment, the discrimination between the contact and noncontact states of the eye can be made without having a visual-line detecting device or the like.

The arrangement of each embodiment described above enables the embodiment to automatically detect whether the operator is looking into the monitor means or not and to automatically select a first operation control mode or a second operation control mode. The mode switchover, therefore, can be effected without necessitating the operator to perform any troublesome operation.

According to the arrangement described above, with a state of having the operator looking into or not looking into the monitor means automatically detected, either a mode of performing a normal operation of the electronic apparatus (a VTR-integrated type camera) or another mode of performing each of a plurality of functions of the apparatus for a predetermined period of time one after another is automatically selected. The arrangement not only permits switchover from one mode to another, without repeating any troublesome operation, but also facilitates the operation of confirming a plurality of functions of the electronic apparatus. The arrangement thus greatly enhances the operability of the apparatus and effectively prevents operation errors.

Further, since an operation control mode is automatically selected in response to an action of looking into the EVF (electronic viewfinder), both a trial shooting operation and a function-demonstrating operation can be smoothly accomplished in a natural manner.

The arrangement of each embodiment described above to automatically detect whether the operator is looking into the electronic viewfinder (EVF) or not and to automatically select the normal operation mode of the VTR-integrated type camera or the mode of serially demonstrating the plurality of functions which the electronic apparatus is capable of performing permits switchover from one mode to another without necessitating the operator to repeat any troublesome operation. The plurality of functions of the electronic apparatus thus can be easily confirmed. The operability of the apparatus can be greatly enhanced and operation errors can be effectively prevented.

Further, since the visual-line detecting means for detecting the visual line of the operator is arranged to be usable in detecting whether the operator is viewing the electronic viewfinder or not, a plurality of operation modes can be naturally performed by just taking a normal shooting posture.

Further, since the eye-contact detecting switch which is arranged to detect whether the eye of the operator is in contact or not is arranged to be useable in detecting whether or not the operator is viewing the EVF (electronic viewfinder), a state in which the operator is viewing the EVF can be easily detected even in a case where the apparatus includes no visual-line detecting function.

Further, the arrangement of detecting the state in which the operator is viewing the electronic viewfinder by the combination of the light emitting element which illuminates the eyeball of the operator as the eye is viewing the monitor means and the light receiving sensor which detects a reflection light of the eyeball permits a discrimination between contact and noncontact states of the eye according to the presence or absence of the reflection light. The arrangement thus enables the apparatus to detect whether the operator is viewing the electronic viewfinder or not, even if the apparatus is not provided with any visual-line detecting function.

According to the arrangement of each embodiment described above, one mode can be smoothly shifted to another among a plurality of operation modes. Particularly, the switching of the demonstration mode of serially performing a plurality of functions over to a normal operation mode and returning to and resuming the demonstration mode can be quickly and smoothly accomplished without repeating any troublesome operation.

(Fourth Embodiment)

Figure 17:
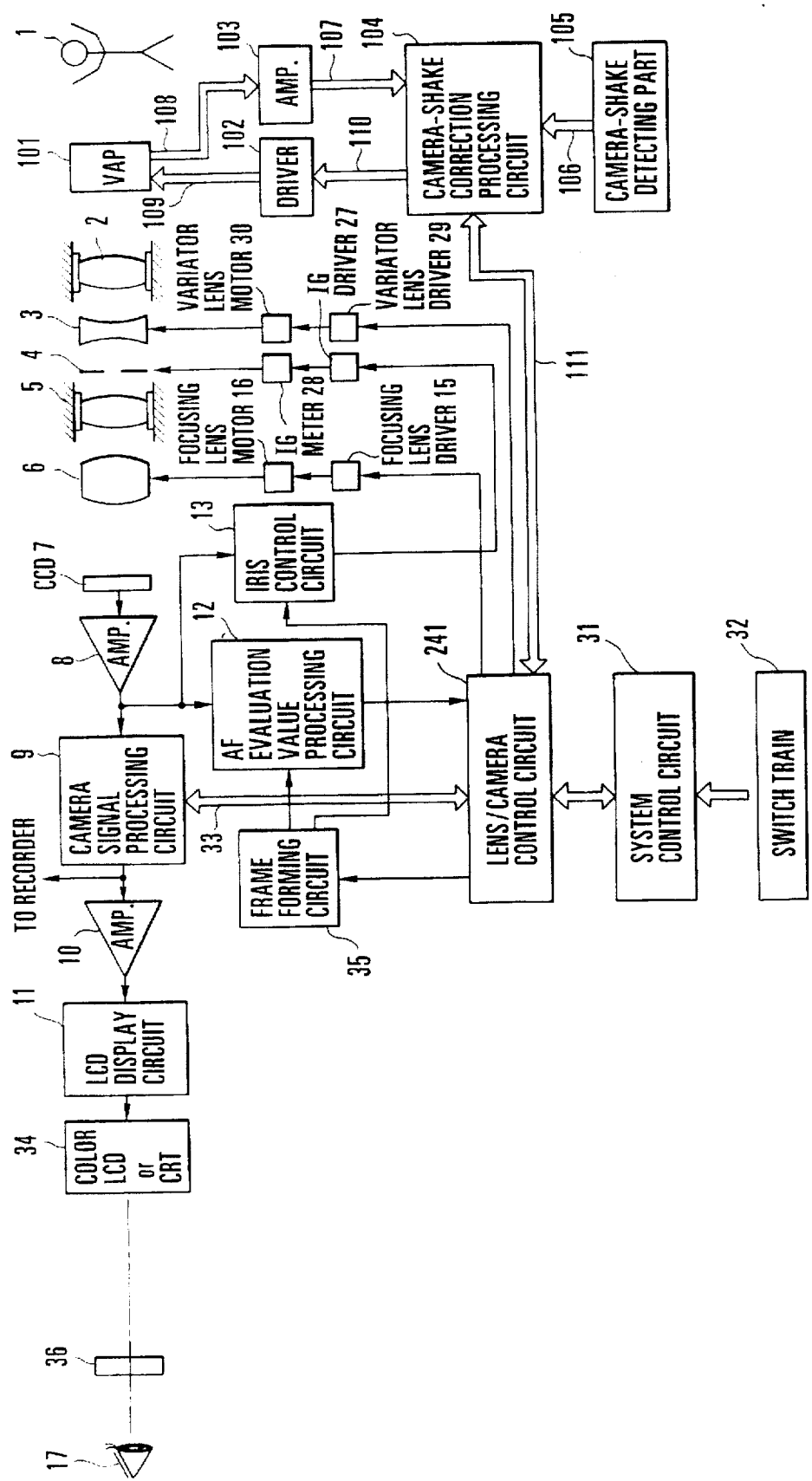
FIG. 17 is a block diagram showing an electronic apparatus having a mode switching means arranged according to this invention as a fourth embodiment, in which the electronic apparatus is applied to a VTR-integrated type camera.

FIG. 17 shows in a block diagram the fundamental arrangement of a camera part and parts disposed therearound of a VTR-integrated type camera which is a fourth embodiment of this invention. In FIG. 17, the same constituent portions as those shown in FIG. 4 are indicated by the same reference numerals. Referring to FIG. 17, the eye 17 of the operator is shown as looking at an LCD (liquid crystal display) monitor 34 disposed within an electronic viewfinder (EVF) which is mounted on the VTR-integrated type camera.

An image of an object of shooting 1 is formed on the image pickup plane of an image sensor 7 which is a CCD or the like through a photo-taking optical system composed of a fixed first lens group 2, a variator lens 3, an iris 4, a fixed third lens group 5 and a focusing lens 6.

The image formed at the image sensor 7 is photoelectrically converted to obtain a video signal. The video signal is supplied through an amplifier 8 to a camera signal processing circuit 9. At the camera signal processing circuit 9, the video signal is subjected to a predetermined signal processing action and is thus converted into a standardized video signal.

The signal thus processed by the camera signal processing circuit 9 is supplied through an amplifier 10 and an LCD display circuit 11 to the LCD monitor 34 to be displayed there as a video image picked up.

The output of the amplifier 8 is supplied also to an AF evaluation value processing circuit 12 and an iris control circuit 13. The AF evaluation value processing circuit 12 is arranged to output an AF evaluation value which is, for example, a high frequency component of the video signal and is at a maximum value when the image picked up is in the sharpest state. The iris control circuit 13 is arranged to detect the degree of exposure by comparing the luminance level of the input video signal with a predetermined reference level and to output a signal for adjusting the aperture of the iris 4 to give an apposite exposure. The signal is supplied to an IG driver 27. In accordance with the signal, the IG driver 27 drives an IG meter 28 to control and adjust the aperture of the iris 4 accordingly. A lens/camera control circuit 241 is arranged to control and cause a focusing lens driver 15 to drive a focusing lens motor 16 to move the focusing lens 6 in such a way as to bring the AF evaluation value to its maximum value.

The lens/camera control circuit 241 is further arranged such that, when the operator of the VTR-integrated type camera operates a magnifying power varying switch which is not shown, the lens/camera control circuit 241 supplies a control signal to a variator lens driver 29 for driving the variator lens 3 accordingly. Then, in accordance with the control signal, the variator lens driver 29 drives a variator lens motor 30 to move the variator lens 3.

A frame control signal indicative of the position of a distance/light measuring frame and a distance/light measuring range is outputted from the lens/camera control circuit 241. Upon receipt of the frame control signal, a frame forming circuit 35 supplies control signals to the AF evaluation value processing circuit 12 and the iris control circuit 13 for the purpose of setting, within the image pickup plane of the image sensor, an evaluation value obtaining range, i.e., the distance/light measuring frame.

A system control circuit 31 is composed of a microcomputer and is arranged to control the whole VTR-integrated type camera. To the system control circuit 31 is connected a switch train 32. The switch train 32 is arranged to enable the operator of the camera to select any of a plurality of functions including the digital feature processes for attaining special effects mentioned in the foregoing and a zooming action and to have the selected function performed.

An optical correction device 101 is a variable angle prism (hereinafter referred to as VAP) which is arranged to correct shaking of the image pickup plane due to camera-shake by optically varying the apex angle thereof. The VAP is formed by sealing a liquid of a high refractive index in between two flat glass plates. An image movement due to camera-shake caused by hand vibrations is corrected with the angle of refraction of light controlled by varying the apex angle according to angle of deviation caused by camera-shake, as shown in FIG. 19. The camera-shake is detected by a camera-shake detecting part 105 which includes, for example, a vibration gyro sensor or the like. Information on the camera-shake outputted from the camera-shake detecting part 105 is supplied to a camera-shake correction processing circuit 104 through a control line 106. In accordance with the camera-shake information, the camera-shake correction processing circuit 104 supplies a correction signal to a driver 102 which is arranged to control the VAP 101 in the direction of correcting the camera-shake. Upon receipt of the signal, the driver 102 drives a VAP driving actuator through a control line 109. Another control line 108 is arranged to transmit to an amplifier 103 the output of a VAP apex angle sensor (not shown) which is arranged to detect the moving position of the VAP 101. A signal outputted from the amplifier 103 is supplied through a control line 107 to the camera-shake correction processing circuit 104. Then, the camera-shake correction processing circuit 104 detects, from the signal of the amplifier 103, whether or not the VAP 101 has reached a position desired for correction of the camera-shake. A control line 111 is arranged to transmit a VAP operating instruction from the lens/camera control circuit 241 to the camera-shake correction processing circuit 104 and to transmit information on the camera-shake from the camera-shake correction processing circuit 104 to the lens/camera control circuit 241.

The details of the camera signal processing circuit 9 which is arranged to execute the processes of digital features are identical with those of the first embodiment described in the foregoing with reference to FIG. 14 and are, therefore, omitted from description.

Figure 18:
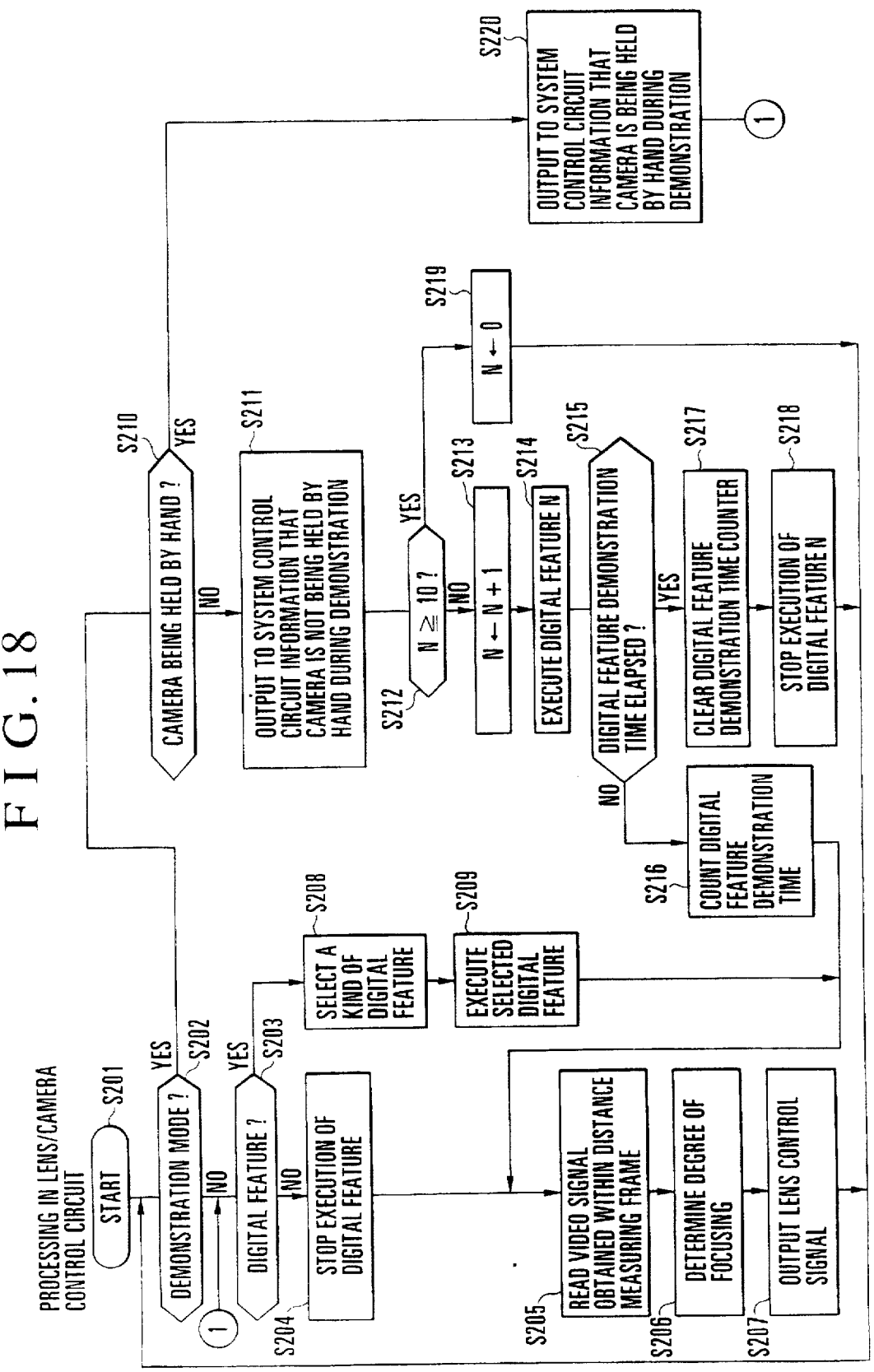
FIG. 18 is a flow chart showing the processing operation of the arrangement shown in FIG. 17.

FIG. 18 is a flow chart showing the processes to be executed within the lens/camera control circuit 241 of the fourth embodiment. Referring to FIG. 18, the flow of operation starts at a step S201. At a step S202, a signal from the system control circuit 31 is checked to find if it indicates the demonstration mode. If not, the flow comes to a step S203. At the step S203, a check is made to find if any instruction for execution of one of the digital feature processes shown in FIG. 13, i.e., for digital image processing, has been given by operating the switch train 32 and information on that instruction has been received from the system control circuit 31. If so, the flow comes to a step S208. The digital feature process selected by operating the switch train 32 is selected at the step S208 and executed at a step S209.

If it is confirmed at the step S203 that no instruction has been given for execution of any of the digital feature processes, the flow comes to a step S204. At the step S204, the execution of the digital feature process is brought to a stop. At a step S205, a signal outputted from the AF evaluation value processing circuit 12 is read as a signal indicating a degree of focusing obtained within the distance measuring frame formed by the frame forming circuit 35. At a step S206, the degree of focusing is determined. At a step S207, a lens control signal for driving the focusing lens 6 is sent to the focusing lens driver 15.

Figures 20A, 20B:
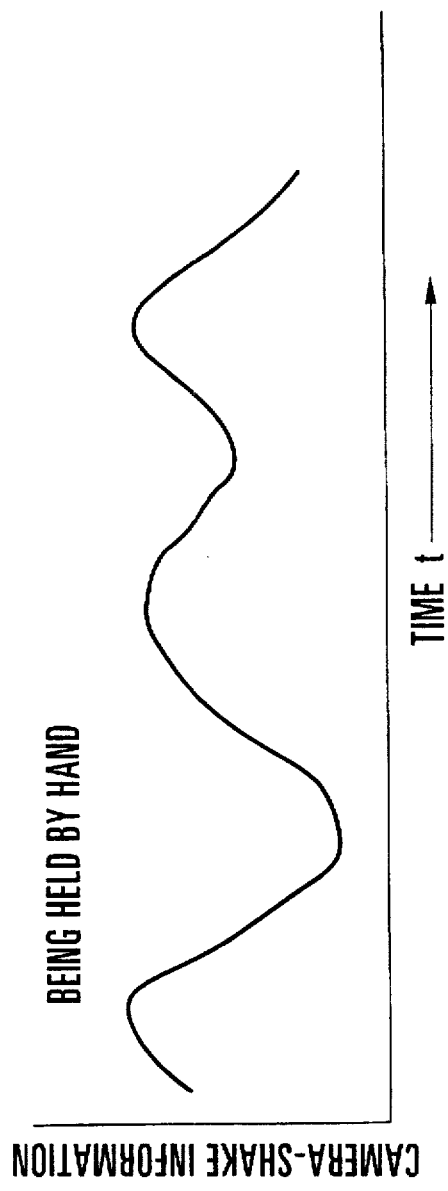
FIGS. 20(a) and 20(b) show the waveforms of a signal outputted from a camera-shake detecting sensor obtained with the camera being shaken and with the camera being not shaken.

In a case where the result of the check made at the step S202 indicates the demonstration mode, the flow comes to a step S210. At the step S210, a check is made to find whether or not the camera is in a state of being held by hand. This check is made on the basis of information supplied to the lens/camera control circuit 241 from the camera-shake correction processing circuit 104 through the control line 111 as shown in FIG. 17. FIG. 20(a) shows the waveform of the output of the camera-shake detecting part 105 (shown in FIG. 17) obtained when the camera is set on a stand or the like and is not held by hand. In that state, the output waveform of the camera-shake detecting part 105 is stable and shows no camera-shake. In a case where the camera is held by hand, the output waveform of the camera-shake detecting part 105 varies as shown in FIG. 20(b). The camera-shake correction processing circuit 104 is arranged to detect a difference between these waveforms of FIGS. 20(a) and 20(b) and to supply the lens/camera control circuit 241 with information indicating whether the camera is held by hand or not.

When it is found that the camera is not held by hand at the step S210, the output waveform of the camera-shake detecting part 105 is stable as shown in FIG. 20(a). In this case, the digital feature processes of varied kinds are serially demonstrated. At a step S211, information indicating that the demonstration mode is being executed and that the camera is not held by hand is supplied to the system control circuit 31. Assuming that a total of ten different kinds of digital feature processes, from No. 1 to No. 10, are available as shown in FIG. 13, these processes are serially demonstrated. At a step S212, a check is made to find if the demonstration has reached the digital feature process No. 10. If not, the flow comes to a step S213 to increment the digital feature process number N by one. At a step S214, the digital feature process corresponding to the incremented number N is executed. One digital feature process is executed for a predetermined demonstration period of time, with time counted at steps S215 and S216. After the step S216, the flow comes to the step S205 to execute the processes for AF (automatic focusing) at the step S205 and the steps subsequent thereto.

The AF processes enable the camera to give an adequate image even while the digital feature is in process of execution. When it is found at the step S215 that one digital feature process has been executed in the predetermined period of time, a time counter which has been counting the demonstration time is cleared. The N-th digital feature process then ceases to be executed.

When an end of the demonstration of all of the ten digital feature processes is confirmed by the step S212, the flow comes to a step S219 to clear the digital feature number N to "0". The flow then comes back to the step S202 to resume the processes for the demonstration all over again from the beginning.

In a case where the camera is judged at the step S210 to be in a state of being held by hand, the flow comes to a step S220. At the step S220, the system control circuit 31 is informed that the camera is in the demonstration mode and that the camera is being held by hand. Then, the demonstration mode is suspended and the flow comes to the process of the step S203. The camera is judged to be held by hand when the output of the camera-shake detecting part 105 is in the waveform as shown in FIG. 20(b). In this instance, it is determined that the camera is being operated by the operator for shooting.

The processes to be executed by the step S203 and the steps subsequent thereto are the processes of the normal shooting operation as described in the foregoing. After completion of a series of these processes, the flow comes to the step S202 and then to the step S210 to make the check for the demonstration mode and to make the check for the state of being held by hand. Therefore, in a case where the camera is in the demonstration mode and is being held by hand, the demonstration mode is suspended to allow the normal operation to continue. If the state of being held by hand changes to a state of not being held by hand, this change is found at the step S210 and the demonstration of the digital feature processes of the varied kinds are resumed.

Figure 21:
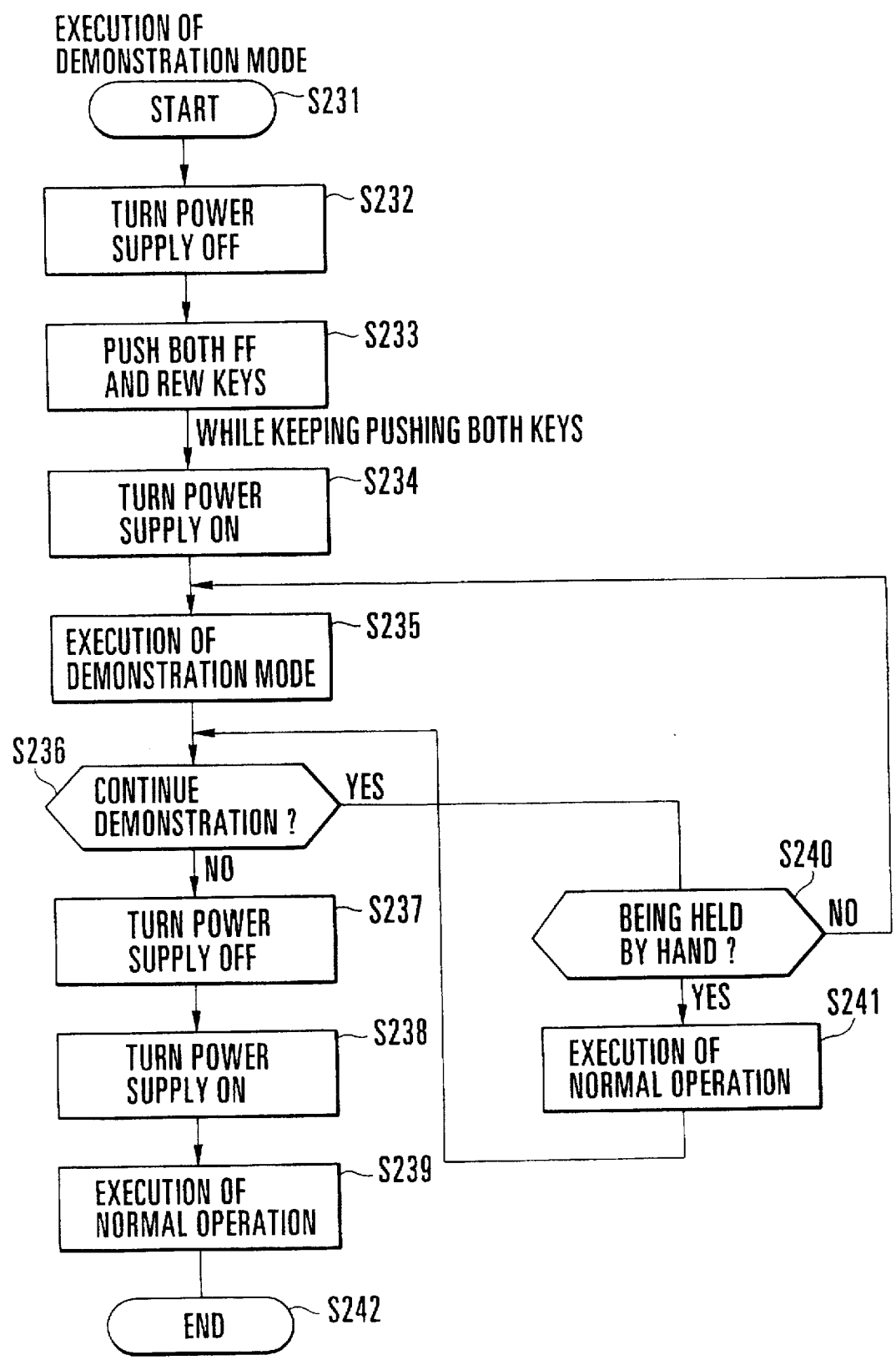
FIG. 21 is a flow chart showing the flow of operation of FIG. 18 as viewed on the side of the operator.

FIG. 21 is a flow chart showing an operating procedure to be taken by the operator for the processes shown in FIG. 18. The processes of steps S231 to S235 of FIG. 21 are equivalent to those of the steps S101 to S105 of FIG. 1 described in the foregoing.

With the demonstration mode found to be still continuing at a step S236, if the camera is found at the step S240 not to be held by hand at present, the flow comes back to the step S235.

If the camera is found at the step S240 to be in a state of being held by hand, the flow comes to a step S241 to allow the camera to be operated in a normal manner. After that, when the state of being held by hand is found by the state S240 to have changed to a state of not being held by hand, the flow comes back to the step S235 to resume the demonstration mode. In order to bring the demonstration mode truly to an end, the power supply is turned off at a step S237 and, after that, again turned on at a step S238 without pushing the FF and REW keys. With the power supply turned off and on in this manner, the demonstration mode is canceled and the flow comes to a step S239 for a normal operation.

The arrangement described above enables the operator to have the VTR-integrated type camera execute, or demonstrate, each of the digital feature processes of varied kinds for a predetermined period of time one after another, so that the contents and the effects of these digital features can be confirmed. The arrangement also permits a normal operation to be performed even while the camera is still in the demonstration mode. The demonstration mode can be resumed after completion of the normal operation.

In a case where the operation mode is to be shifted to a normal operation mode by canceling the demonstration mode, the shift of modes can be easily effected by turning the power supply off and again turning it on. Therefore, the embodiment has a good operability in this respect.

(Fifth Embodiment)

In the fourth embodiment, an optical camera-shake correcting system is utilized as a means for making a discrimination between a state of being held by hand and a state of not being held by hand. In the case of the fifth embodiment, on the other hand, the same purpose is attained by utilizing an electronic camera-shake correcting system employed in a VTR-integrated type camera.

Figure 22:
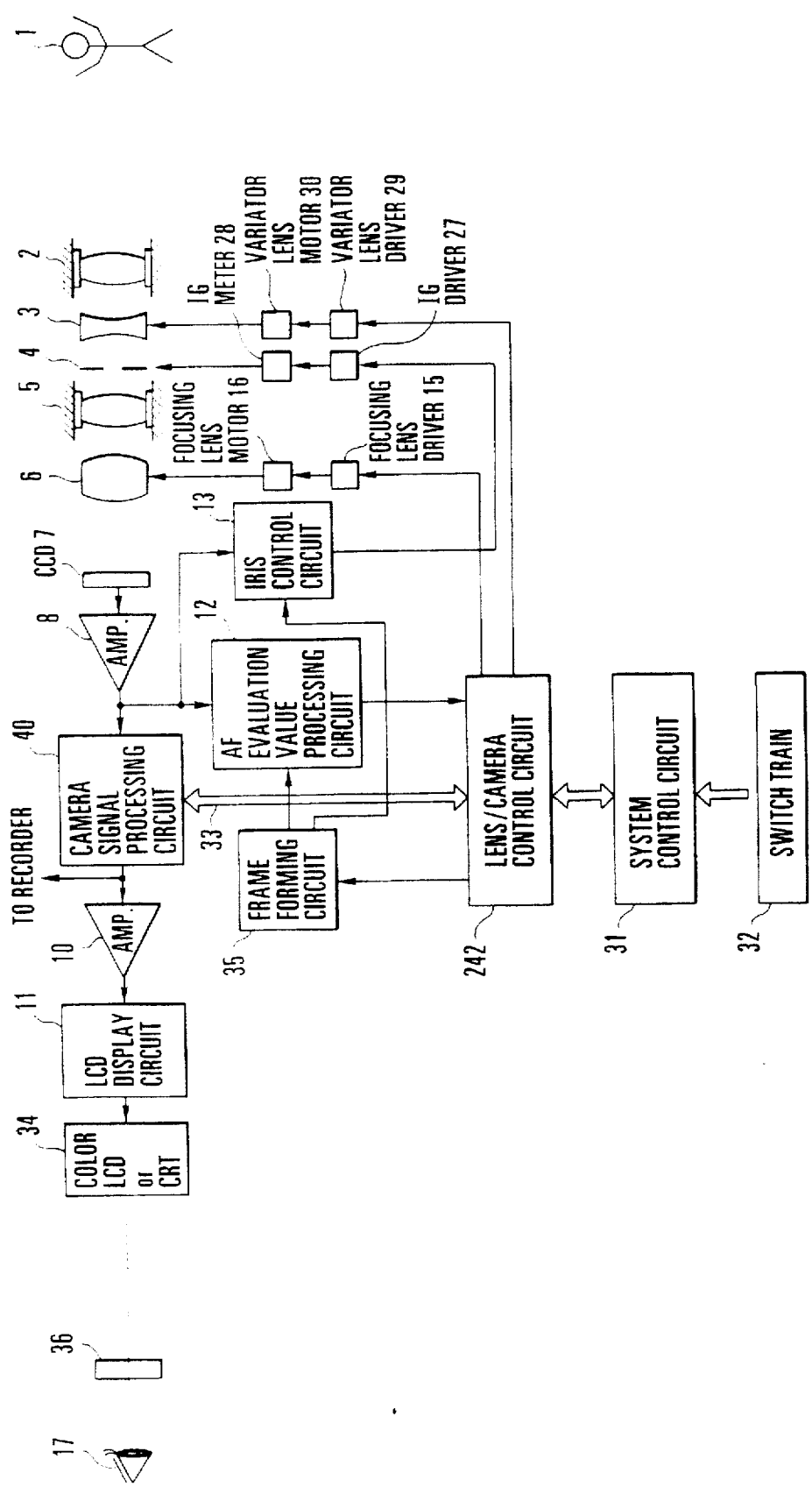
FIG. 22 is a block diagram showing the arrangement of a fifth embodiment of this invention.

FIG. 22 is a block diagram showing the fundamental arrangement of the apparatus which has an electronic camera-shake correcting system included in a camera signal processing circuit 40. The arrangement of FIG. 22 is the same as that of FIG. 17, except that the parts of FIG. 17 related to the optical camera-shake correcting system are deleted in the arrangement of FIG. 22.

Figure 23:
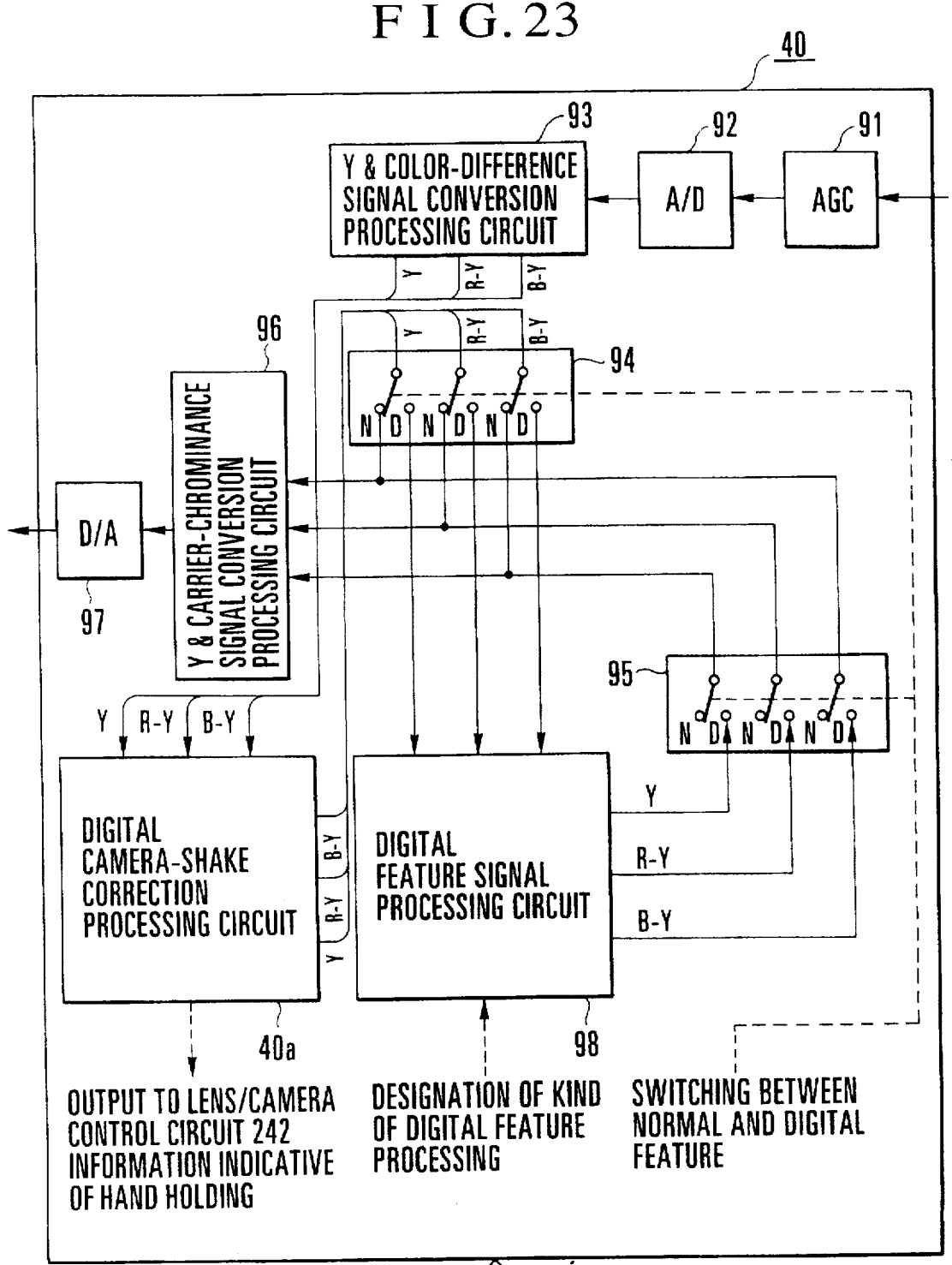
FIG. 23 is a block diagram showing the internal arrangement of a camera signal processing circuit 40 included in the block diagram of FIG. 22.

FIG. 23 shows the internal arrangement of the camera signal processing circuit 40. The flow of signals is basically the same as that of FIG. 14. Therefore, in FIG. 23, all the parts arranged in the same manner as in FIG. 14 are indicated by the same reference numerals and the details of them are omitted from description. In the case of FIG. 23, the discriminating means in this invention is formed by inserting a digital camera-shake correction processing circuit 40a in between a Y and color-difference signal conversion processing circuit 93 and a switch train 94. FIG. 24 is a flow chart showing, in an extremely simplified manner, the processes to be executed within the digital camera-shake correction processing circuit 40a. Referring to FIG. 24, the flow of operation begins at a step S251. At a step S252, information on a video image which has a little wider angle of view than the angle of view of an actual recording video image is taken into an image memory in a field synchronizing manner.

At a step S253, an amount of vector relative to the movement of the object of shooting is computed by comparing video image information of a current field with that of a previous field. At a step S254, a check is made to find if the absolute value of the vector is larger than a predetermined threshold value A and smaller than another predetermined threshold value B. If so, the result of the check is considered to indicate a camera-shake and the flow comes to a step S255. At the step S255, a camera-shake correcting process is executed, for example, in the following manner. In cutting the actual recording video image out from the above-stated video image information of a little wider angle of view, a sweep-out address is adjusted by moving the cutting-out frame of the actual recording video image in a direction in which the camera-shake can be corrected. Since the camera-shake correction indicates a state of being held by hand, holding-by-hand information is turned on at a step S256. The flow then comes back to the series of processes beginning with the step S252. Then, if the movement vector is found to be less than the threshold value A which is smaller than the threshold value B, both the object and the camera can be regarded as remaining stationary as there is little movement. The camera is then likely set on a stand or the like. The threshold value B is set at such a value that indicates a greater movement of the object than a normal camera-shake. Hence, a relation of "A<|movement vector|<B" is considered to indicate a camera-shake. In a case where the absolute value of the movement vector is judged to be larger than the predetermined threshold value B or to be less than the predetermined threshold value A at the step S254, it is very likely that the camera is set on a tripod or that the object is moving. In such a case, therefore, the flow comes to a step S257 to turn off the holding-by-hand information, without making any camera-shake correction. The flow then comes back to the step S252.

At the digital camera-shake correction processing circuit 40a, the holding-by-hand information shown in FIG. 24 is outputted and supplied to a lens/camera control circuit 242 through an information transmitting route 33, at the same time as the execution of the camera-shake correcting process. The video image information which is obtained through the camera-shake correcting process is processed through the switch train 94 in the same manner as in the case of FIG. 14. Information on the on-state and off-state of the holding-by-hand information is sent through the information transmitting route 33 to the lens/camera control circuit 242. After that, the lens/camera control circuit 242 operates in the same manner as in the case of the fourth embodiment described in the foregoing.

(Sixth Embodiment)

Figure 25:
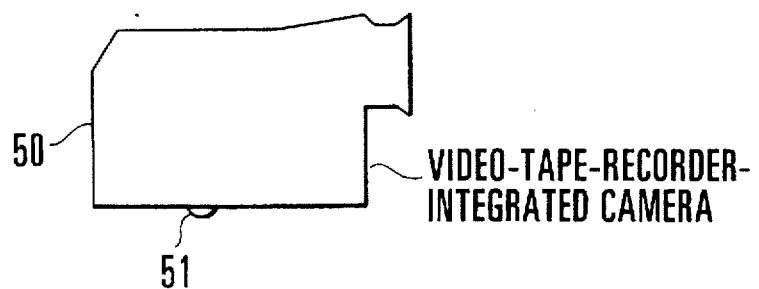
FIG. 25 shows, as a sixth embodiment of this invention, an arrangement used for detecting whether a VTR-integrated type camera is placed on a stand or not.

The discrimination between a state of being held by hand and a state of not being held by hand can be made also by a simple detecting means which is as shown in FIG. 25. In the case of FIG. 25, a VTR-integrated type camera 50 which represents a sixth embodiment of this invention is provided with a switch 51. The switch 51 is arranged to turn on and off according to whether the VTR-integrated type camera is placed on a stand or not. The arrangement of this switch represents the discriminating means in this invention in the case of the sixth embodiment.

Figure 26:
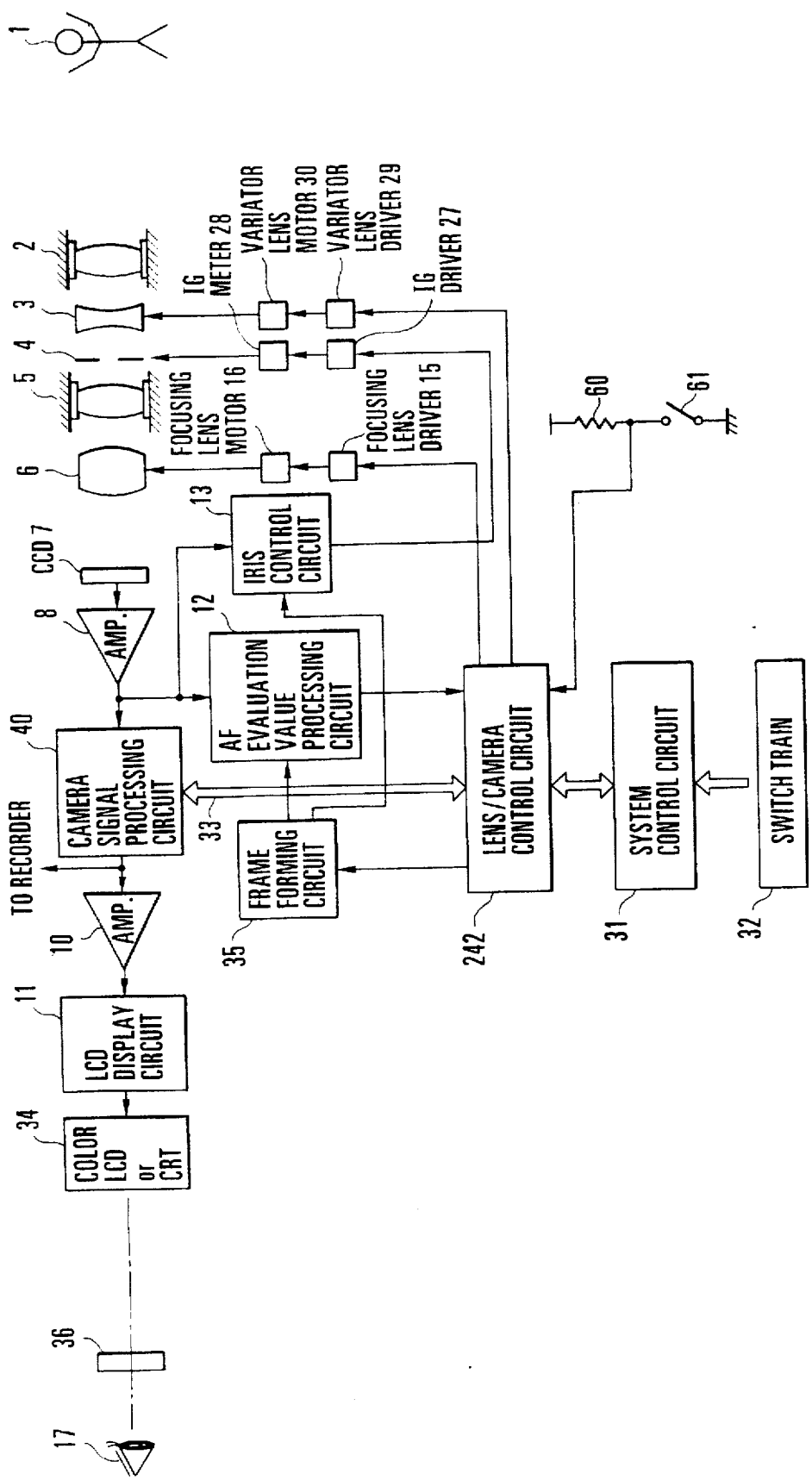
FIG. 26 is a block diagram showing in detail the arrangement of the sixth embodiment of this invention.

The system arrangement within the VTR-integrated type camera is as shown in FIG. 26. Referring to FIG. 26, a signal outputted from a switch 61 is supplied to a lens/camera control circuit 242. Since the output signal line of the switch 61 is pulled up by a resistor 60, the output signal is supplied to the lens/camera control circuit 242 at a low level when the switch 61 is closed and at a high level when the switch 61 is opened.

A discrimination is made between a state of being placed on a stand and a state of not being placed on a stand according to the high or low level of the signal outputted from the switch 61. After that, the operation mode of the camera is switched between the demonstration mode and a normal operation mode by executing processes in the same manner as in the cases of the fourth and fifth embodiments of this invention.

As apparent from the foregoing description, the function of the discriminating means in this invention can be carried out by any means that are capable of detecting a state of holding the VTR-integrated type camera by hand. The form of such means is not limited.

According to the arrangement of the embodiment described above, when the electronic apparatus is judged by the discriminating means to be held by the hand of the operator while a plurality of modes are executed according to a predetermined procedure by the mode executing means, a mode executing action of the mode executing means is either brought to a stop or inhibited by a control means.

Therefore, in a case where the operator wishes to try a shooting operation while execution of the demonstration mode is in process, this attempt of the operator is detected and the demonstration mode can be automatically suspended to allow the shooting operation as desired by the operator. The operation mode thus can be quickly switched from one mode over to another without necessitating any troublesome operation that would be required by the conventional VTR-integrated camera. The arrangement according to this invention, therefore, enables a commercial product to permit quick selection of a desired operation mode and an accurate operation.

Further, even in a case where a trial shooting operation is performed by the operator while the camera is in the demonstration mode, if the trial shooting operation is brought to a stop, the demonstration mode is resumed to execute each of a plurality of modes for a predetermined period of time one after another. Therefore, the kinds and the details of a plurality of digital image signal processing features included in an electronic apparatus such as a VTR-integrated type camera can be accurately and easily confirmed without hindering a trial shooting operation.

In a case where the above-stated discriminating means detects that the electronic apparatus (or the VTR-integrated type camera) is held by the hand of the operator, the execution by the mode executing means is suspended to permit a normal shooting operation. When the electronic apparatus is found to be no longer held by the hand of the operator, the execution of the mode by the mode executing means is resumed. Therefore, in returning to the demonstration mode, the end of the trial shooting operation is automatically detected and the demonstration mode can be quickly resumed. This arrangement permits an accurate operation with excellent operability.

The arrangement disclosed in the foregoing by which a discrimination between a state of being held by the operator and a state of not being held by the operator of the electronic apparatus is made according to the state of camera-shake correcting means enables the apparatus to reliably suspend and resume the demonstration mode without recourse to any additional arrangement.

Another disclosed arrangement by which the discrimination between a state of being held by the operator and a state of not being held by the operator of the electronic apparatus is made according to the output of a movement detecting means which detects a movement vector from the video signal enables the apparatus to reliably suspend and resume the demonstration mode without recourse to any additional arrangement.

A further disclosed arrangement whereby the state of using the electronic apparatus is detected by detecting means which detects that the body of the apparatus is placed on a stand or the like makes it possible to make an accurate discrimination between the demonstration mode and a state of trial shooting even in a case where the apparatus includes no camera-shake correcting means.

Further, in a case where the electronic apparatus is found to be in a state of being held by the operator while the mode executing means is in process of executing a plurality of modes one by one, each for a predetermined period of time, according to a predetermined procedure, a mode executing action of the mode executing means can be suspended to allow a shooting means to be operated. Therefore, when the operator desires to try a shooting operation while the demonstration is in process, this desire is automatically detected to allow the trial shooting operation by suspending the demonstration mode. The invented arrangement thus permits quick switchover from one mode to another without repeating any troublesome operations like in the case of the conventional apparatus. The electronic apparatus according to this invention, therefore, has an excellent operability to permit accurate operations.

The above-stated electronic apparatus is a video camera or a VTR-integrated type camera. The video camera is arranged according to this invention to be capable of demonstrating the kinds and functions of digital image signal processes one after another, without hindering any trial shooting operation. In accordance with this invention, the kinds and functions of a plurality of digital image signal processing actions of an electronic apparatus such as a video camera are easily and accurately reviewable through the demonstration.

In accordance with this invention, as described above, the apparatus can be simply arranged to efficiently permit demonstration and trial shooting. The demonstration and the trial shooting can be easily switched from one over to the other without any complicated switching operation. The apparatus thus has an excellent operability, which gives a great advantage in operating it not only in case of a demonstration at a store selling the apparatus but also in cases where it is desired to confirm the kinds and the functions of a plurality of modes of the apparatus.

What is claimed is:

1. An electronic apparatus arranged to permit switching between a first control mode for an image sensing operation and a second control mode for for a demonstration operation, comprising:

monitor means for permitting recognition by visual sensation of an operating state of said electronic apparatus;

detecting means for detecting that an operator of said electronic apparatus is viewing said monitor means; and control means for selectively switching and effecting the first control mode and the second control mode on the basis of an output of said detecting means.

2. An apparatus according to claim 1, wherein the first control mode is a mode of allowing a normal operation of said electronic apparatus to be effected, and the second control mode is a mode of sequentially effecting each of a plurality of functions included in said electronic apparatus for a predetermined period of time.

3. An apparatus according to claim 1, wherein said monitor means is an electronic viewfinder (EVF).

4. An apparatus according to claim 1, wherein said detecting means includes visual-line detecting means for detecting a visual line of the operator who is viewing said monitor means.

5. An apparatus according to claim 1, wherein said detecting means includes an eye-contact detecting switch for detecting whether an eye of the operator is in contact with said monitor means or not.

6. An apparatus according to claim 1, wherein said detecting means includes a light emitting element for illuminating an eyeball of the operator who is viewing said monitor means and a light receiving sensor for detecting light reflected by the eyeball, and is arranged to detect whether an eye of the operator is in contact with said monitor means on the basis of the presence or absence of the reflected light.

7. An electronic apparatus arranged to permit switching between a first control mode in which a normal operation of a video camera is allowed to be performed and a second control mode in which each of a plurality of functions included in said electronic apparatus is automatically and sequentially demonstrated for a predetermined period of time, comprising:

an electronic viewfinder for permitting recognition by visual sensation of an operating state of said electronic apparatus;

detecting means for detecting that an operator of said electronic apparatus is viewing said electronic viewfinder; and control means for selectively switching and effecting the first control mode and the second control mode on the basis of an output of said detecting means.

8. An apparatus according to claim 7, wherein said detecting means is a means for detecting a visual line of sight of the operator.

9. An apparatus according to claim 7, wherein said detecting means is a means for detecting whether the eye of the operator is brought into contact with the electronic viewfinder.

10. An apparatus according to claim 7, wherein said plurality of functions includes a function involving processing of a digital image signal.

11. An electronic apparatus having a plurality of operation modes and capable of individually demonstrating each of the plurality of operation modes, comprising:

mode executing means for automatically demonstrating the plurality of operation modes in accordance with a predetermined procedure;

determining means for determining whether said electronic apparatus is being held by an operator of said electronic apparatus; and control means for controlling said mode executing means on the basis of an output of said determining means so as to stop a mode executing action of said mode executing means when said determining means has determined that said electronic apparatus is being held by the operator.

12. An apparatus according to claim 11, wherein said mode executing means is arranged to sequentially execute each of the plurality of operation modes for a predetermined time.

13. An apparatus according to claim 12, wherein said electronic apparatus is a video camera, and wherein the plurality of operation modes include digital image signal processing actions.

14. An apparatus according to claim 13, wherein said control means is arranged to suspend a mode executing action of said mode executing means and allow a normal shooting operation to be performed when said determining means has determined that said electronic apparatus is being held by the operator, and is arranged to resume the mode executing action of said mode executing means when said determining means has determined that said electronic apparatus is not being held by the operator.

15. An apparatus according to claim 11 or 14, wherein said determining means includes camera-shake correcting means and is arranged to determine whether said electronic apparatus is being held by the operator, on the basis of a state of said camera-shake correcting means.

16. An apparatus according to claim 11 or 14, wherein said determining means includes motion detecting means for detecting a motion vector from a video signal and is arranged to determine whether said electronic apparatus is being held by the operator, on the basis of a state of said motion detecting means.

17. An apparatus according to claim 11 or 14, wherein said determining means is arranged to detect that a body of said electronic apparatus is placed on a stand or the like.

18. An electronic apparatus having a plurality of operation modes and capable of individually demonstrating each of the plurality of operation modes, comprising:

shooting means for performing a shooting operation;

mode executing means for automatically and sequentially demonstrating each of the plurality of operation modes for a predetermined period of time in accordance with a predetermined procedure;

determining means for determining whether said electronic apparatus is being held by an operator of said electronic apparatus; and control means for controlling said shooting means and said mode executing means on the basis of an output of said determining means so as to suspend a mode executing action of said mode executing means and allow said shooting means to perform the shooting operation when said determining means has determined that said electronic apparatus in being held by the operator while the mode executing action of said mode executing means is in process.

19. An apparatus according to claim 18, wherein said electronic apparatus is a video camera, and wherein the plurality of operation modes include digital image signal processing actions.

20. An apparatus according to claim 19, wherein said plurality of operation modes includes an electronic zoom mode, a reproduction of stroboscopic action mode, and image overlapping mode and a fading mode.

21. An apparatus according to claim 18, wherein said determining means includes image shake preventing means and recognizes gripping by an operator on the basis of an output of said image shake preventing means.

22. An apparatus according to claim 18, wherein said determining means is a switch provided on a surface on which a camera is mounted and recognizes whether the camera is mounted on the surface or held by the operator on the basis of ON or OFF states of said switch.

23. An apparatus according to claim 19, further comprising a monitor for confirming execution of the plurality of operation modes.

* * * * *

UNITED STATES PATENT AND TRADEMARK OFFICE
CERTIFICATE OF CORRECTION

PATENT NO. : 5,745,798
DATED : April 28, 1998
INVENTOR(S) : Masahide Hirasawa

It is certified that error appears in the above-identified patent and that said Letters Patent is hereby corrected as shown below:

Col. 1, line 31, after "days" insert -- are --.

Col. 2, line 34, delete "Si11" and insert -- S111 --.

Col. 2, line 37, delete "Si11" and insert -- S111 --.

Signed and Sealed this

Eighth Day of December, 1998

*Attest:*

BRUCE LEHMAN

*Attesting Officer*     *Commissioner of Patents and Trademarks*